United States Patent
Tsusaka et al.

(10) Patent No.: US 6,713,207 B2
(45) Date of Patent: Mar. 30, 2004

(54) MEMBRANE ELECTRODE ASSEMBLY, AND SOLID POLYMER FUEL CELL USING THE ASSEMBLY

(75) Inventors: Kyoko Tsusaka, Aichi-ken (JP); Masaya Kawasumi, Aichi-ken (JP); Yu Morimoto, Aichi-ken (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 320 days.

(21) Appl. No.: 09/858,979

(22) Filed: May 17, 2001

(65) Prior Publication Data
US 2002/0001744 A1 Jan. 3, 2002

(30) Foreign Application Priority Data

May 18, 2000 (JP) ........................ 2000-145877
Dec. 28, 2000 (JP) ........................ 2000-401275

(51) Int. Cl.$^7$ ................................ H01M 8/10
(52) U.S. Cl. ........................ 429/40; 429/42
(58) Field of Search .............. 429/30, 31, 32, 429/33, 40, 41, 42, 43

(56) References Cited

U.S. PATENT DOCUMENTS

| 3,707,522 A | 12/1972 | Simons |
| 5,378,800 A | 1/1995 | Mok et al. |
| 5,722,295 A | 3/1998 | Sakai |
| 5,872,175 A | 2/1999 | Lee |

FOREIGN PATENT DOCUMENTS

| JP | 4-58822 | 9/1992 |
| JP | 6-76838 | 3/1994 |
| JP | 6-111827 | 4/1994 |
| JP | 6-231780 | 8/1994 |
| JP | 9-320611 | 12/1997 |
| JP | 10-340732 | 12/1998 |
| WO | WO 97/03476 | 1/1997 |
| WO | WO 99/38909 A1 | 8/1999 |

OTHER PUBLICATIONS

Asahi Chem Ind. Co. Ltd., "High–Strength Polyamide Fiber And Its Production", Patent Abstracts of Japan, Publication No. 06173166, Jun. 21, 1994.
Melvin I. Kohan, Nylon Plastics Handbook, Hanser, p. 542. , Hanser/Gardner Publications, Inc., Sep. 1995.
Derwent Publication, JP 62185747, Japan Synthetic Rubber Co. Ltd. Aug. 14, 1987.
Derwent Publication, JP 09089081, Fuji Heavy Ind. Ltd., Toray Ind., Inc. Juji Jukogyo KK, Mar. 13, 1997.
Derwent Publication, JP 10060269, Unitika Ltd. (10060269) Mar. 3, 1998.

*Primary Examiner*—Randy Gulakowski
*Assistant Examiner*—Monique Wills
(74) *Attorney, Agent, or Firm*—Oblon, Spivak, McClelland, Maier & Neustadt, P.C.

(57) ABSTRACT

Disclosed is a membrane electrode assembly obtained by bonding electrodes to both surfaces of a solid polymer electrolyte membrane suitably for use in a solid polymer fuel cell. In order to maintain not only the solid polymer electrolyte but also the electrode in appropriate wet states, the catalyst layer of the assembly contains a metalloxane polymer in the intra-catalyst-layer electrolyte including an electrode catalyst preferably in an amount of 0.5 to 50 wt % of the total weight of the intra-catalyst-layer electrolyte and the metalloxane polymer contained therein exclusive of the electrode catalyst.

18 Claims, 6 Drawing Sheets

MEMBRANE ELECTRODE ASSEMBLY, AND SOLID POLYMER FUEL CELL USING THE ASSEMBLY

BACKGROUND OF THE INVENTION

1. Field of the Invention

The present invention relates to a membrane electrode assembly applied to a solid polymer fuel cell. More particularly, a membrane electrode assembly applied to a solid polymer fuel cell which is suitable for use in a transportable compact power supply, a vehicle-mounted power source, a cogeneration system and the like, and a solid polymer fuel cell using the assembly.

2. Description of Related Art

A solid polymer fuel cell is a fuel cell in which a solid polymer electrolyte membrane is used as an electrolyte. The basic unit thereof, a unitary cell, is constituted of a pair of electrodes bonded respectively to both surfaces of a solid polymer electrolyte membrane (hereinafter, referred to as an "membrane electrode assembly".) Each of the electrodes has a two-layer structure consisting of a diffusion layer and a catalyst layer, and the latter is provided on a surface in contact with the solid polymer electrolyte membrane.

The diffusion layer is a layer for supplying a reactant gas to the catalyst layer and exchanging electrons, and it is made from materials having porosity and electron conductivity. The catalyst layer is a layer for causing a catalyst contained therein to initiate electrode reaction. Yielding the electrode reaction requires a three-phase interface where three phases of an electrolyte, a catalyst, and a reactant gas coexist. Therefore, the catalyst layer is typically constituted of a catalyst or a catalyst supported by a catalyst carrier and a porous layer including an electrolyte having the same composition as the solid polymer electrolyte membrane.

By the way, non-crosslinked perfluoro-based electrolytes, typified by Nafion (a registered trademark for products manufactured by E.I. du Pont de Nemours and Company), and a variety of hydrocarbon-based electrolytes have been known as solid polymer electrolytes for use in a solid polymer fuel cell. Any of these, however, needs water for appearance of ion conductivity. Therefore, if the operation of the fuel cell enters a dry condition, so-called dry-up occurs, meaning that water content of a solid polymer electrolyte membrane decreases, and so does electrical conductivity of the membranes, which may become a cause of lowered output of the fuel cell.

On the other hand, if the operation of the fuel cell enters a wet condition, excessive water builds up inside electrodes. In addition, when protons are conducted within a solid polymer electrolyte membrane from one electrode (anode) to the other electrode (cathode), the water also transfers along with the protons to the side of the cathode (this will hereinafter be referred to as "water electroosmosis".) Besides, in the cathode, water is produced via electrode reaction. If the water is left standing, so-called flooding occurs, meaning that the three-phase interface in the catalyst layer is clogged with the water, which may become a cause of lowered output of the fuel cell.

Accordingly, it is necessary to maintain a solid polymer electrolyte membrane in an appropriate wet state so as to ensure high output with stability from a solid polymer fuel cell. Conventional types of a solid polymer fuel cell have employed a method by which reactant gases supplied to electrodes are humidified with an aid of auxiliary machinery such as a steam generator or a mist atomizer while the amount of humidification is controlled so as to adjust water content of the solid polymer electrolyte membrane (this will hereinafter be referred to as "water control".) Besides, there has also been a known method whereby water is injected directly into a reactant gas passages formed within a separator.

However, to make a solid polymer fuel cell more compact and lightweight, it is desired to improve water control property of a membrane electrode assembly so as to lower a degree to which the water control depends on the auxiliary machinery. In order to achieve this, it is considered effective to convert a solid polymer electrolyte membrane into a thin film of high strength. This is because enhancing the strength of a solid polymer electrolyte membrane permits the membrane to be a thin film, which facilitates maintaining the whole of the membrane in a uniform wet state.

As a method of converting a solid polymer electrolyte membrane into a thin film, there have been known several methods including a method whereby an electrolyte is made to contain another crosslinkable polymer for reinforcement (e.g. see Japanese Patent Unexamined Publication Nos. 06(1994)-76838 and 10(1998)-340732), a method whereby a coating of fluorine-based monomer is applied to a reinforcing material constituted of porous fibers and then the monomer is polymerized to introduce ion-exchange groups thereto (e.g. see Japanese Patent Examined Publication No.04(1992)-58822), and a method whereby an electrolyte membrane is bonded to a parfluorocarbon polymer woven fabric by thermal compression to be converted into a multilayer film (e.g. see Japanese Patent Unexamined Publication No. 06(1994)-231780.)

In addition, there has been a known method whereby ion clusters in a perfluoro sulfonic acid membrane are interknitted through an inorganic glasslike network in silicon oxide phase (siloxane polymer), silicon oxide+titanium oxide phase, zirconium oxide phase, or the like so as to make a hybrid membrane by sol-gel reactions initiated by immersion of the perfluoro sulfonic acid membrane in an alcohol solution containing alkoxide such as tetraethoxysilane, a mixture of tetrabutyltitanate and tetraethoxysilane, tetrabutylzirconate or the like (e.g. see Journal of Applied Polymer Science, vol.55, p.181 (1995).) Besides, there has also been a known method whereby finely granulated silica and/or fibrous silica fiber is added in order to increase water content and ion conductivity of a solid polymer electrolyte membrane and those of catalyst layers (e.g. see Japanese Patent Unexamined Publication No. 06(1994)-111827.)

Using any of the above-described methods to make a solid polymer electrolyte membrane thinner in thickness and higher in strength, the whole of the membrane can easily be maintained in a comparatively uniform wet state. Flooding or dry-up in a fuel cell, however, arises in dependence on not only the water control property of a solid polymer electrolyte membrane but also that of an electrode.

Accordingly, any of those conventional methods can suppress the flooding and the dry-up resulting from a solid polymer electrolyte membrane to a certain extent, but it is difficult to suppress flooding and dry-up resulting from an electrode. In addition, as an example of giving attention to improving the water control property of an electrode in order to relieve a load on auxiliary machinery at the time of water control, Japanese Patent Unexamined Publication No. 06(1994)-111827 mentions a technique to improve electrical conductivity by adding granulated or fibrous silica. And yet, this technique is not effective enough to greatly improve electrical conductivity since it does not allow of introduction of silica into the inside of conductive paths which are still finer, meaning that this technique does not contribute to the water control property of an electrode.

Such a membrane electrode assembly is commonly produced by application of pressure bonding by hot-pressing to the surfaces of diffusion layers coated with a paste containing a catalyst or a catalyst supported by a catalyst carrier and an electrolyte in the form of a solution. However, conventional types of membrane electrode assemblies present such a problem that bonding failure may occur or that the conductive paths are apt to be discontinuous, because those assemblies are made by merely pressing and bonding electrolytes in the form of solutions contained in catalyst layers to electrolytes in the form of membranes.

On the other hand, in order to solve the problem that output of a fuel cell is lowered by flooding which is caused by excessive water building up particularly inside a cathode with the operating condition of the fuel cell being in a wet condition, it is common practice to employ a method by which the structure of an electrode is optimized. For example, for the purpose of enlarging the three-phase interface, there has been known a method whereby an electrode is made to have the two-layer structure consisting of a diffusion layer and a catalyst layer, the latter of which is provided on the surface in contact with a solid polymer electrolyte membrane. As already described, the diffusion layer is a layer for supplying a reactant gas to the catalyst layer and conducting exchange of electrons, and it is commonly composed of materials having porosity and electron conductivity. The catalyst layer, in turn, is a layer being a reaction site of electrode reaction, and it is commonly composed of a catalyst or a catalyst supported by a catalyst carrier and an electrolyte which has the same composition as the solid polymer electrolyte membrane (an intra-catalyst-layer electrolyte.)

In addition, for example, Japanese Patent Unexamined Publication No. 05(1993)-36418 discloses a porous electrode to which fluororesin is used to adhere catalyst-supporting carbon whose surface is covered with a solid polymer electrolyte for the purpose of enlarging the reaction site for the electrode.

Furthermore, Japanese Patent Unexamined Publication No. 09(1997)-320611 discloses an electrode for use in a solid polymer fuel cell which is obtained by covering a solid polymer electrolyte membrane with a liquid mixture of carbon black supporting a platinum catalyst, fluorine-based ion-exchange resin, and a solvent-soluble fluorine-based polymer having no ion-exchange group, for the purpose of imparting water repellency to the porous electrode uniformly. Besides, this publication also discloses an electrode for use in a solid polymer fuel cell which is obtained by kneading and stretching a mixture of carbon black supporting a platinum catalyst and polytetrafluoroethylene to produce a porous film, and then by impregnating the film with fluorine-based ion-exchange resin and a solvent-soluble fluorine polymer which has no ion-exchange groups.

Humidification of electrolytes with an aid of auxiliary machinery requires various components including a water tank for storing water used in humidification, a humidifier, a condenser for reclaiming water discharged from a fuel cell. This presents a problem that the entire system of the fuel cell should be upsized. Besides, the humidification of electrolytes with the aid of auxiliary machinery needs extra power for the auxiliary machinery, which may become a cause of reduced energy conversion efficiency of the fuel cell.

On the other hand, in a solid polymer fuel cell, as described above, water is produced on the cathode side by electrode reaction. Utilization of the product-water directly for humidifying electrolytes can lessen or eliminate the need for humidifying the electrolytes with auxiliary machinery, promising miniaturization, weight reduction, and high efficiency of the entire system of fuel cell.

Conventional types of electrodes for use in solid polymer fuel cells, however, are not suitable in structure for utilizing the product-water effectively, because the structure is designed to facilitate discharge of water building up inside the electrode, for example by applying water repellency treatment to the surfaces of fine pores in the electrodes.

For example, in an electrode for use in a solid polymer fuel cell disclosed by Japanese Patent Unexamined Publication No. 09(1997)-320611, water repellency is intended to be imparted to an electrode by coating at least a part of surfaces of fine pores in the electrode with a solvent-soluble, fluorine-based polymer which has no ion-exchange group. Even by using the disclosed method, however, it is difficult to cover all ion-exchange groups exposed on the surface of a gas-phase side with a thin and uniform coating of the solvent-soluble fluorine-based polymer. Consequently, most of the product-water is discharged from the inside of the fine pores rather than being effectively utilized for humidifying electrolyte, so that humidification with an aid of auxiliary machinery is essential for stable operation.

SUMMARY OF THE INVENTION

The present invention has been made in view of the above circumstances and has an object to overcome the above problems and to provide a membrane electrode assembly in which water control of a solid polymer electrolyte can be performed easily to lighten a load on auxiliary machinery at the time of the water control.

Another object of the present invention is to provide a membrane electrode assembly in which the bonding property of electrodes and a solid polymer electrolyte membrane are enhanced so as to reduce occurrence of bonding failure and that of discontinuousness in conductive paths.

Further, another object of the present invention is to provide a solid polymer fuel cell capable of producing high output with stability even under a no-humidification condition by lessening or eliminating the need for humidifying electrolyte with an aid of auxiliary machinery.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the present invention, as embodied and broadly described herein, a membrane electrode assembly has a pair of electrodes respectively bonded to both surfaces of a solid polymer electrolyte membrane having a first conductive path, the electrodes each having a catalyst layer. The catalyst layer of at least one of the electrodes has a second conductive path and contains a first metalloxane polymer in an intra-catalyst-layer electrolyte including an electrode catalyst. Desirably, this metalloxane polymer is generated within the second conductive path of the electrolyte, and the metalloxane polymer is added in a state of metalloxane monomer and thereafter polymerized by polycondensation reaction. In this case, the solid polymer electrolyte membrane preferably includes a second metalloxane polymer.

In the membrane electrode assembly according to the present invention, a network structure of the first metalloxane polymer is introduced into the inside of the second conductive path of the catalyst layer. Therefore, high output can be obtained stably regardless of whether the operation of the fuel cell is in a wet condition or a dry condition. This may be ascribable to the following mechanism: an interaction between the catalyst layer and water is increased by the first metalloxane polymer having been introduced into the catalyst layer so that mass transfer is accelerated within the catalyst layer.

In addition, still higher output can be obtained in the case where the second metalloxane polymer is introduced into the solid polymer electrolyte membrane. This may be ascribable to the following mechanism: because of the network structure of the second metalloxane polymer having been introduced into the solid polymer electrolyte membrane, it is possible to make the solid polymer electrolyte thinner in thickness and higher in strength, and to suppress water electroosmosis. As a result, water content of the solid polymer electrolyte membrane is maintained appropriately.

According to the membrane electrode assembly of the present invention, the first metalloxane polymer is contained in the intra-catalyst-layer electrolyte in the catalyst layer of at least one of the electrodes, which are bonded to both surfaces of the solid polymer electrolyte. The presence of the first metalloxane polymer produces such an effect to accelerate mass transfer within the catalyst layer, and thereby improving water control property of the electrode.

In addition, in the case where the solid polymer electrolyte membrane further contains the second metalloxane polymer, distribution of water within the solid polymer electrolyte membrane can be made uniform easily, which produces such an effect that water control property of the solid polymer electrolyte membrane improves.

Further, the first metalloxane polymer generated within the catalyst layer enhances the bonding property of the electrode and the solid polymer electrolyte membrane, producing such an effect that it is made possible to obtain a membrane electrode assembly having an excellent output performance.

Furthermore, in this type of membrane electrode assembly obtained by bonding electrodes to both surfaces of a solid polymer electrolyte membrane, it is preferred that a gas-phase surface of the intra-catalyst-layer electrolyte containing the first metalloxane polymer be covered with a water-repellent layer having gas-permeability.

Covering the gas-phase surface of the intra-catalyst-layer electrolyte with the water-repellent layer having gas-permeability suppresses discharge of water from the catalyst layer to the diffusion layer without inhibiting a reactant gas from diffusing to the catalyst layer. Consequently, a part of the water produced by electrode reaction remains within the catalyst layer. The residual water within the catalyst layer is then put back into the solid polymer electrolyte membrane by diffusion, and reused to humidify the solid polymer electrolyte membrane. Therefore, even under low-humidification or no-humidification conditions, water content of the solid polymer electrolyte membrane can be maintained at a level sufficient enough for stable operation, thereby ensuring high output with stability.

Thus, in the solid polymer fuel cell comprising the membrane electrode assembly in which a pair of the electrodes are bonded respectively to both surfaces of the solid polymer electrolyte membrane, the membrane is maintained in an appropriate wet state even under the condition where no humidification is performed with an aid of auxiliary machinery, which produces the effect that high output is ensured, if at least one of the electrodes comprises a catalyst layer containing a catalyst or a catalyst supported by a carrier and an intra-catalyst-layer electrolyte, and if the gas-phase surface of the intra-catalyst-layer electrolyte is covered with the water-repellent layer having gas-permeability.

DETAILED DESCRIPTION OF THE PREFERRED EMBODIMENTS

Figure 1:
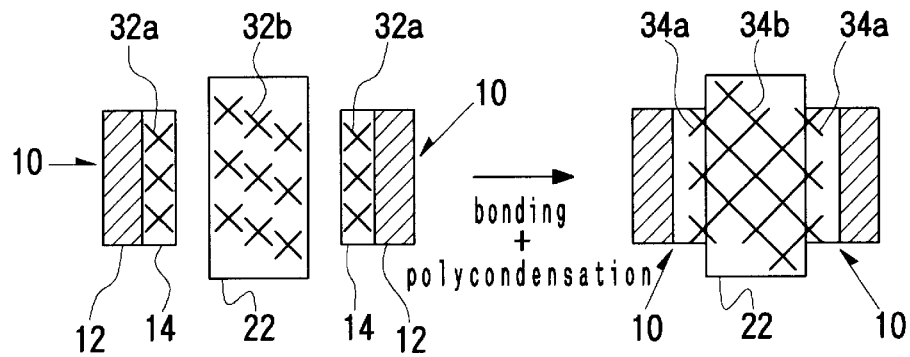
FIG. 1 is a view for illustrating steps of a method for manufacturing a membrane electrode assembly in a solid polymer fuel cell according to one preferred embodiment of the present invention.

Hereinafter, a detailed description of preferred embodiments of a membrane electrode assembly embodying the present invention will now be given. The membrane electrode assembly consistent with the present invention comprises a pair of electrodes each having a diffusion layer and a catalyst layer, and a solid polymer electrolyte membrane having the pair of electrodes bonded to both surfaces thereof via the catalyst layers.

Here, the diffusion layer constituting a part of the electrode is the layer for supplying a reactant gas to, and exchanging electrons with, the catalyst layer. The material for the diffusion layer is not limited to any specific one as long as it is porous and has electron conductivity. Generally, porous carbon cloth, porous carbon paper or the like is used.

The catalyst layer constituting another part of the electrode comprises a catalyst, an intra-catalyst-layer electrolyte, and a first metalloxane polymer. The catalyst may be contained in the catalyst layer independently or in a state supported by a catalyst carrier. The material for the catalyst or the catalyst carrier is not limited to any specific one, and any of various materials may be used depending on the purpose.

The intra-catalyst-layer electrolyte is added in order to impart ion conductivity to the catalyst layer as well as to form a three-phase interface within the catalyst layer. The material for the intra-catalyst-layer electrolyte is not limited to any specific one, and any of various materials may be used depending on the purpose. Generally, an electrolyte having the same composition as the solid polymer electrolyte membrane is used. Yet, it is also applicable to use an electrolyte having different composition.

The first metalloxane polymer used herein refers to a polymer having a metalloxane bond anywhere in the molecules. For the sake of relatively easy method for manufacturing a membrane electrode assembly with electrodes that are excellent in water control property, the first metalloxane polymer is preferably a polymer having a metalloxane bond resulting from polycondensation caused by sol-gel reactions.

One suitable example of the first metalloxane polymer is a polymer having a metalloxane bond such as a Si—O—Si bond, a Ti—O—Ti bond, a Zr—O—Zr bond or the like. Alternatively, the first metalloxane polymer may be a polymer having a metalloxane bond with a plurality of metal elements, such as a Si—O—Ti bond, a Si—O—Zr bond, a Ti—O—Zr bond or the like. Further, the first metalloxane polymer may be made of one kind of polymer having one or more metalloxane bonds stated above, or of a mixture of two or more kinds of polymers.

Preferably, the first metalloxane polymer is contained in an amount of 0.5 to 50 wt % of the total weight of the first metalloxane polymer and the intra-catalyst-layer electrolyte. If the content of the first metalloxane polymer is less than 0.5 wt %, the effect of improving the water control property or the bonding property lessens, which is undesirable. On the contrary, if the content exceeds 50 wt %, the ionic conductivity of the intra-catalyst-layer electrolyte lowers, which is also undesirable. The content of the first metalloxane polymer is more preferably from 5 to 20 wt %.

The material for the solid polymer electrolyte membrane consistent with the present invention is not limited to any specific one, and any of various materials may be used. That is, the solid polymer electrolyte membrane may be made of a fluorine-based polymer with its polymer main chain entirely or partially fluorinated and having ion-exchange groups. Alternatively, the solid polymer electrolyte membrane may be a hydrocarbon-based polymer with the polymer main chain containing no fluorine and having ion-exchange groups.

Further, the ion-exchange groups contained in such a polymer are not limited to any specific ones. In other words, the ion-exchange groups may be cation-exchange types such as sulfonic acid, carboxylic acid, phosphonic acid, phosphonous acid, phenol or the like. Alternatively, the ion-exchange groups may be anion-exchange types such as primary amine, secondary amine, tertiary amine, quaternary amine, or the like. In addition, these polymers may include two or more kinds of cation-exchange groups or anion-exchange groups.

Suitable examples of the solid polymer electrolyte having a fluorine-based polymer with its polymer main chain entirely or partially fluorinated include a perfluorocarbon sulfonic acid-based polymer, a perfluorocarbon phosphonic acid-based polymer, a trifluorostyrene sulfonic acid-based polymer, an ethylenetetrafluoroethylene-g-styrenesulfonic acid-based polymer and the like.

Suitable examples of the hydrocarbon-based solid polymer electrolyte include a polysulfone sulfonic acid, a polyaryletherketone sulfonic acid, a polybenzimidazole alkylsulfonic acid, a polybenzimidazole alkylphosphonic acid, and the like.

In order to improve the water control property of the solid polymer electrolyte membrane, the solid polymer electrolyte membrane preferably contains a second metalloxane polymer therein. The second metalloxane polymer used herein refers to the polymer having a metalloxane bond anywhere in the molecules. The second metalloxane polymer may be a polymer of the same kind as the first metalloxane polymer or a different kind.

Preferably, the second metalloxane polymer is contained in an amount of 0.5 to 50 wt % of the total weight of the second metalloxane polymer and the solid polymer electrolyte. If the content of the second metalloxane polymer is less than 0.5 wt %, the effect of reinforcing the solid polymer electrolyte membrane or of improving the water control property of the membrane lessens, which is undesirable. On the contrary, if the content exceeds 50 wt %, the solid polymer electrolyte membrane becomes embrittled and the electric conductivity lowers, which is also undesirable. More preferably, the content of the second metalloxane polymer is 5 to 20 wt %.

Next, description is given to working of the membrane electrode assembly consistent with the present invention. Introduction of the first metalloxane polymer into the catalyst layer improves the water control property of the electrode. Accordingly, a solid polymer fuel cell that is constituted of the membrane electrode assembly consistent with the present invention is capable of suppressing dry-up or flooding. Further, introduction of the second metalloxane polymer into the solid polymer electrolyte membrane improves the water control property of both the electrode and the solid polymer electrolyte membrane, and exhibits effect of suppressing dry-up or flooding remarkably.

The reason why the membrane electrode assembly consistent with the present invention exhibits such an excellent water control property is considered as follows. That is, the first metalloxane polymer that has been introduced into the catalyst layer has an M—OH group (here, the letter "M" is Si, Ti, Zr or the like) therein, which is a hydrophilic terminal group within the polymer. Also, oxygen atoms contained in the $M_1$—O—$M_2$ bond (here, the letter "M" is Si, Ti, Zr, or the like), which constitutes the main chain of the first metalloxane polymer may be hydrogen bonded with water.

Therefore, the M—OH group and oxygen atoms contained in the $M_1$—O—$M_2$ bond interact with water contained in the catalyst layer. As a result, transfer of water is accelerated at the interface between the solid polymer electrolyte membrane and the intra-catalyst-layer electrolyte, and the interface between the intra-catalyst-layer electrolyte and the gas phase.

To be more concrete, it is considered that in the cathode, water produced by the catalyst is adsorbed, and discharged to the gas phase via the first metalloxane polymer. In the anode, on the other hand, the first metalloxane polymer serves to trap humidifying water contained in the reactant gas, to suppress electroosmosis of the water from the anode to the solid electrolyte membrane, or to trap water diffused from the cathode due to concentration gradient of water contained in the solid polymer electrolyte membrane. In other words, it is considered that the first metalloxane polymer generated in the vicinity of the catalyst, which is the site of electrode reaction, functions as a buffer phase for water. As a result, the water control property of the electrode is improved.

Also, in the case where the second metalloxane polymer is introduced into the solid polymer electrolyte membrane, the second metalloxane polymer is considered to be generated inside, or in the vicinity of hydrophilic clusters contained in the solid polymer electrolyte membrane. The hydrophilic clusters are transfer paths of water so that the three-dimensional network structure of the second metalloxane polymer functions as a physical impediment and suppresses electroosmosis of the water. As a result, the concentration gradient of water is kept small and the water content is maintained in a uniform state.

When electroosmosis of the water is suppressed, normally mobility of protons decreases. Generally, this causes ionic conductivity of the solid polymer electrolyte membrane to decease as well. However, the membrane electrode assembly consistent with the present invention is capable of maintaining high ionic conductivity regardless of whether the operation is performed under a wet condition or a dry condition. The reason may be concluded that the second metalloxane polymer introduced into the hydrophilic clusters or channels connecting the hydrophilic clusters expands the hydrophilic clusters and the channels being conductive paths of protons. Further, it may be concluded that protons hop via the hydrophilic terminal group contained in the second metalloxane polymer or the oxygen atoms contained in the metalloxane bond.

The second metalloxane polymer also functions as a reinforcing material for the solid polymer electrolyte membrane so that the solid polymer electrolyte membrane is made thinner. As a result, it is further facilitated to achieve uniform distribution of the product-water in the membrane.

Further, upon press bonding the membrane electrode assembly, if there is bonding failure or discontiguous conductive paths, mass transfer at the interface between the catalyst layer and the solid polymer electrolyte membrane is obstructed, which results in lowering of output. On the contrary, the membrane electrode assembly consistent with the present invention is capable of manufacturing high output with stability. The reason is considered that the first metalloxane polymer generated in the catalyst layer strengthens the bonding physically or chemically. Further, it is considered that by introducing the first metalloxane monomer and the second metalloxane monomer into the catalyst layer and the solid polymer electrolyte membrane respectively and by causing polycondensation at the time of bonding, the bonding is further strengthened and continuity of the conductive paths is improved.

Next, description is given to a method for manufacturing a membrane electrode assembly. A first method for manufacturing a membrane electrode assembly includes the step of preparing an electrode having a catalyst layer formed therein, the catalyst layer contains a first metalloxane monomer in an intra-catalyst-layer electrolyte including an electrolyte catalyst, and the step of thermally bonding a solid polymer electrolyte membrane to the catalyst layer of the electrode obtained by the electrode preparing step, so as to bond the solid polymer electrolyte membrane to the electrode. The catalyst layer should be formed on a diffusion layer constituting the electrode, and the catalyst-layer side of the electrode should be thermally bonded to the surface of the solid polymer electrolyte membrane. In this case, it is convenient if the method comprises the step of preparing the solid polymer electrolyte membrane containing a second metalloxane monomer beforehand, and the step of thermally bonding the electrode having the above-deserved intra-catalyst-layer electrolyte containing the first metalloxane monomer to the surface of the thus obtained solid polymer electrolyte membrane containing the second metalloxane monomer. As a result, a network structure of the metalloxane polymer can be introduced between the solid polymer electrolyte membrane and the electrode, which is desirable.

A second method for manufacturing the membrane electrode assembly, firstly, a catalyst layer is formed on a surface of a solid polymer electrolyte membrane, and thereafter to form a diffusion layer on a surface of the catalyst layer. This method comprises the step of forming on the surface of the solid polymer electrolyte membrane a catalyst layer containing a first metalloxane monomer in an intra-catalyst-layer electrolyte containing an electrode catalyst, and the step of forming a diffusion layer on the surface of the catalyst layer which has been formed on the surface of the solid polymer electrolyte membrane. The latter step may involve fastening of the diffusion layer to the catalyst layer instead of bonding. In this case too, it is preferred that the solid polymer electrolyte membrane contain the second metalloxane monomer.

When the catalyst layer containing the first metalloxane monomer is generated on the surface of the diffusion layer or on that of the solid polymer electrolyte membrane, and then the electrode or the diffusion layer is thermally bonded or bonded to the solid polymer electrolyte membrane via the catalyst layer, the first metalloxane polymer is generated within the catalyst layer. As a result, the water control property of the electrode improves, and flooding and dry-up are suppressed. The first metalloxane polymer thus generated in the catalyst layer enhances the bonding property of the electrode and the solid polymer electrolyte membrane so as to reduce the occurrence of bonding failure and that of discontinuousness in conductive paths.

In addition, the first metalloxane monomer added to the catalyst layer and the second metalloxane monomer added to the solid polymer electrolyte membrane generate the first metalloxane polymer within the catalyst layer and the second metalloxane polymer within the solid polymer electrolyte membrane respectively at the time of thermal bonding. Besides, at the interface between the solid polymer electrolyte membrane and the electrode, polycondensation takes place between the first and the second metalloxane monomers. That leads to improvements in the water control property of both the electrode and of the solid polymer electrolyte membrane, and thereby suppresses flooding and dry-up even further. As an additional plus, the bonding property of the electrode and the solid polymer electrolyte membrane is enhanced still further.

The method for manufacturing the membrane electrode assembly, according to the present invention, include the step of forming the catalyst layer containing at least the catalyst, the intra-catalyst-layer electrolyte and the first metalloxane monomer on the surface of the diffusion layer or on that of the solid polymer electrolyte membrane, and the step of forming an assembly of a diffusion layer, a catalyst layer and a solid polymer electrolyte membrane. That produces such an effect that it is made possible to obtain a membrane electrode assembly comprising electrodes that are excellent in water control property.

In addition, in the case where the method further comprises the electrolyte membrane preparing step of preparing the solid polymer electrolyte membrane containing the second metalloxane monomer, it is made easier to achieve uniform distribution of water within the solid polymer electrolyte membrane. That produces such an effect that it is made possible to obtain a membrane electrode assembly comprising a solid polymer electrolyte membrane having excellent water control property.

Description hereinafter is given to a method for manufacturing a membrane electrode assembly consistent with a first preferred embodiment of the present invention. The manufacturing method of this preferred embodiment comprises an electrode preparing step, an electrolyte membrane preparing step, and an electrode bonding step.

First, description is given to the electrode preparing step. The electrode preparing step is the step to form on the surface of a diffusion layer a catalyst layer containing at least: a catalyst; an intra-catalyst-layer electrolyte; and a first metalloxane monomer. To be more specific, the electrode is constituted by applying a paste containing: a catalyst or a catalyst supported by a catalyst carrier; an intra-catalyst-layer electrolyte; and the first metalloxane monomer (hereinafter, the paste is referred to as the "catalyst layer paste") on the surface of the diffusion layer made of porous carbon cloth or paper. The term "to apply" used herein means to form a thin layer with a paste on the surface of a component member. The method of applying includes various methods such as a spray method, a doctor blade method, and a brush coating method.

For example, in the case of manufacturing a solid polymer fuel cell using the membrane electrode assembly consistent with the present invention, generally, the catalyst is platinum or platinum alloy that is supported on the surface of a catalyst carrier such as carbon black (hereinafter, referred to as "PT/C"). The proportion of the PT/C in the catalyst layer is determined depending on the material and the composition of the electrode or the solid polymer electrolyte membrane so as to make electrode reaction most effectively. In addition, as the intra-catalyst-layer electrolyte, an electrolyte solution (an electrolyte polymer whose high-order structure is not-yet-formed) is preferred.

In addition, the first metalloxane monomer may be a polymer having a metalloxane bond resulting from polycondensation caused by sol-gel reactions. Especially, silicon-based alkoxides are suitable. Specifically, suitable examples include the silicon-based alkoxides comprising one or a plurality of mixtures selected from a group consisting of tetramethoxysilane, tetraethoxysilane, methyltrimethoxysilane, methyltriethoxysilane, ethyltrimethoxysilane, ethyltriethoxysilane, dimethyldimethoxysilane, dimethyldiethoxysilane, phenyltrimethoxysilane, phenyltriethoxysilane, dimethoxydiphenylsilane, diethoxydiphenylsilane, dimethoxymethylphenylsilane, diethoxymethylphenylsilane, phenethyltrimethoxysilane, phenethyltriethoxysilane, and derivatives thereof. Further, the first metalloxane monomer maybe anyone of the above alkoxides, or alternatively a mixture of two or more of the alkoxides.

In addition to the silicon-based alkoxides stated above, the first metalloxane monomer may be a titanium-based alkoxides, or a zirconium-based alkoxides. Alternatively, the first metalloxane monomer may be a mixture of two or more alkoxides selected from the above alkoxides.

The addition amount of the first metalloxane monomer to the catalyst layer paste is determined depending on the kind of the first metalloxane monomer so as to make the content of the first metalloxane polymer 0.5 to 50 wt %, or more preferably 5 to 20 wt % of the total weight of the polymer generated by polycondensation reaction (the first metalloxane polymer) and the intra-catalyst-layer electrolyte.

Next, description is given to the electrolyte membrane preparing step. The electrolyte membrane preparing step is the step to manufacture a solid polymer electrolyte membrane containing the second metalloxane monomer. Specifically, it is preferable to impregnate the solid polymer electrolyte membrane with the second metalloxane monomer.

Similarly to the first metalloxane monomer, the second metalloxane monomer may be silicon-based alkoxides, titanium-based alkoxides, or zirconium-based alkoxides. Alternatively, the second metalloxane monomer may be a mixture of two or more alkoxides selected from the above alkoxides. Further, the second metalloxane monomer may be of the same kind as the first metalloxane monomer, or a different kind.

The addition amount of the second metalloxane monomer to the solid polymer electrolyte membrane is determined depending on the kind of the second metalloxane monomer so as to make the content of the second metalloxane polymer 0.5 to 50 wt %, or more preferably 5 to 20 wt % of the total weight of the polymer generated by polycondensation reaction (the second metalloxane polymer) and the solid polymer electrolyte membrane.

Next, description is given to the electrode bonding step. The electrode bonding step is the step to sandwich the solid polymer electrolyte between the electrodes in a manner to make intimate contact with catalyst layers formed on one surface of the electrodes, followed by thermal bonding. Normally, the thermal bonding is performed by hot-pressing. It should be noted that the catalyst layer of the electrode contains the first metalloxane monomer and the solid polymer electrolyte contains the second metalloxane monomer. Accordingly, upon bonding the electrodes to the solid polymer electrolyte membrane, the first metalloxane polymer is generated in the catalyst layer and the second metalloxane polymer is generated in the solid polymer electrolyte. Further, at the interface between the electrode and the solid polymer electrolyte, polycondensation occurs between the first metalloxane polymer and the second metalloxane polymer.

Next, description is given to a method for manufacturing a membrane electrode assembly consistent with a second preferred embodiment of the present invention. The manufacturing method of this preferred embodiment is characterized in that the method further comprises a first polycondensation step in addition to the electrode preparing step, the electrolyte membrane preparing step, and the electrode bonding step.

The first polycondensation step is performed to generate the first metalloxane polymer in the catalyst layer by polycondensation of the first metalloxane monomer, after preparing the electrode having the catalyst layer containing the first metalloxane monomer in the electrode preparing step but before thermal bonding. There are various methods to cause polycondensation of the first metalloxane monomer, and the most suitable method among them is to perform thermal vacuum drying on the electrode on which the catalyst layer is formed.

Next, description is given to a method of manufacturing a membrane electrode assembly consistent with a third preferred embodiment of the present invention. The manufacturing method of this preferred embodiment is characterized in that the method further comprises a second polycondensation step in addition to the electrode preparing step, the electrolyte membrane preparing step, and the electrode bonding step described above.

The second polycondensation step is performed to generate the second metalloxane polymer in the solid polymer electrolyte membrane by polycondensation of the second metalloxane monomer, after manufacturing the solid polymer electrolyte membrane containing the second metalloxane monomer in the electrolyte membrane preparing step but before thermally bonding. Similarly to the first polycondensation step, there are various methods to cause polycondensation of the second metalloxane monomer, and the most suitable method among them is to perform thermal vacuum drying.

Next, description is given to a method for manufacturing a membrane electrode assembly consistent with a fourth preferred embodiment of the present invention. The manufacturing method of this preferred embodiment is characterized in that the method comprises both the first polycondensation step as well as the second polycondensation step described above in addition to the electrode preparing step, the electrolyte membrane preparing step, and the electrode bonding step also described above.

In this method, first, the electrode preparing step is performed to form the electrode comprising the catalyst layer containing the first metalloxane monomer, and then the first polycondensation step is performed to generate the first metalloxane polymer in the catalyst layer. Further, the electrolyte membrane preparing step is performed to prepare the solid polymer electrolyte membrane containing the second metalloxane monomer, and then the second polycondensation step is performed to generate the second metalloxane polymer within the solid polymer electrolyte membrane. Finally, in the electrode bonding step, the solid polymer electrolyte membrane is sandwiched between the electrodes in a manner to make intimate contact with the catalyst layers, followed by thermal bonding.

Next, description is given to a method for manufacturing a membrane electrode assembly consistent with a fifth preferred embodiment of the present invention. The manufacturing method of this embodiment comprises an electrolyte membrane preparing step, a catalyst layer forming step, and a diffusion layer forming step. Among these steps, the electrolyte membrane preparing step is the same as the above-mentioned electrolyte membrane preparing step included in the manufacturing method of the first preferred embodiment, and thus the description is omitted.

The catalyst layer forming step is the step to form a catalyst layer containing at least: a catalyst; an intra-catalyst-layer electrolyte; and a first metalloxane monomer on the surface of a solid polymer electrolyte membrane. One suitable example of the method to form the catalyst layer is to directly apply a catalyst layer paste on the surface of the solid polymer electrolyte membrane.

Alternatively, the catalyst layer maybe formed by the following method: First, the catalyst layer is formed into a sheet-like form (a sheet forming step); and then the sheet-like catalyst layer is bonded to the solid polymer electrolyte membrane by heating (a catalyst layer bonding step). Here, the "the sheet-like catalyst layer" may be a sheet made of a third material such as a plastic film with the catalyst paste applied on the surface thereof, or it may be the catalyst itself formed into a separate sheet. In the former case, the catalyst layer together with the third material sheet is brought into intimate contact with the solid polymer electrolyte membrane, followed by thermal bonding and removal of the third material sheet.

The diffusion layer forming step is the step to form the diffusion layer onto the catalyst layer that is, in turn, formed on the surface of the solid polymer electrolyte membrane. In the case where the diffusion layer is formed by thermal bonding to the catalyst layer, the first metalloxane monomer contained in the catalyst layer is polymerized to generate the first metalloxane polymer by polycondensation in the process of thermal bonding performed in either the catalyst layer forming step or the diffusion layer forming step. Likewise, the second metalloxane monomer contained in the solid electrolyte membrane is polymerized to generate the second metalloxane polymer in the catalyst layer forming step or the diffusion layer forming step.

In the case of using the sheet-like catalyst layer in the manufacturing method of this preferred embodiment, prior to thermally bonding the sheet-like catalyst layer to the solid polymer electrolyte membrane, the first metalloxane monomer in the catalyst layer may be polymerized to generate the first metalloxane polymer therein through polycondensation (a third polycondensation step). Also, prior to forming the catalyst layer on the surface of the solid polymer electrolyte membrane, the second metalloxane monomer contained in the solid polymer electrolyte membrane may be polymerized to generate the second metalloxane polymer by polycondensation (a fourth polycondensation step).

Next, description is given to working of the manufacturing method consistent with the present invention. In the manufacturing method consistent with the present invention, the first metalloxane monomer is added to the catalyst layer. Accordingly, the first metalloxane polymer is generated within the catalyst layer in the electrode bonding step, the first polycondensation step, the catalyst layer forming step, the third polycondensation step, and/or the diffusion layer forming step, or in other steps. Because of the thus generated first metalloxane polymer, interaction between the catalyst layer and water occurs to a greater extent. As a result, the water control property of the electrode improves.

Further, in the case that the manufacturing method of the present invention further comprises the electrolyte membrane preparing step to add the second metalloxane monomer to the solid polymer electrolyte membrane, the second metalloxane polymer is generated within the solid polymer electrolyte membrane in the electrode bonding step, the second polycondensation step, the catalyst layer forming step, the fourth polycondensation step, and/or the diffusion layer forming step, or in other steps. Because of the thus generated second metalloxane polymer, interaction between the solid polymer electrolyte membrane and water occurs to a greater extent. As a result, the water control property of the membrane improves. In addition, the second metalloxane polymer also serves to reinforce the solid polymer electrolyte membrane. As a result, it is possible to make the membrane thinner, which facilitates product-water within the membrane to be distributed uniformly.

Further, according to the manufacturing method consistent with the present invention, the bonding property of the electrode and the solid polymer electrolyte membrane improves, and thus the output performance also improves. Especially, in the case where the first metalloxane monomer and the second metalloxane monomer are added to the catalyst layer and the solid polymer electrolyte membrane respectively, and polycondensation is made to occur at the time of bonding, the thus obtained membrane electrode assembly exhibits excellent water control property. The reason for this effect is considered as follows. That is, in manufacturing the assembly, the first metalloxane polymer generated in the catalyst layer and the second metalloxane polymer generated in the solid polymer electrolyte undergo polycondensation to generate continuous metalloxane polymer. As a result, the bonding is reinforced physically or chemically, and mass transfer at the interface between the solid polymer electrolyte membrane and the intra-catalyst-layer electrolyte is promoted.

Further, in the case of using an electrolyte in solution as the intra-catalyst-layer electrolyte for preparing an electrode, the thus obtained electrode exhibits excellent water control property. Although not having been clarified totally, the reasons for this effect may be such as the following:(1) Upon solidification of the electrolyte, the first metalloxane polymer prevents the three-phase interface from being crushed so that the diffusion path for the reactant gas is secured; (2) Upon solidification of the electrolyte, the hydrolyzed first metalloxane monomer (for example, $Si(OH)_4$ and the like) forms large-sized hydrophilic clusters so that the proton conductivity is promoted; (3) When the hydrolyzed first metalloxane monomer undergoes dehydrating polycondensation, water is derived, and the water prevents shrinkage of hydrophilic clusters so that the hydrophilic clusters are formed in large size in the intra-catalyst-layer electrolyte; (4) When the hydrolyzed first metalloxane monomer undergoes dehydrating polycondensation, water is derived, and the water softens the solid polymer electrolyte membrane so that the bonding property between the solid polymer electrolyte membrane and the electrode improves.

In another preferred embodiment of the present invention described hereinafter, a solid polymer fuel cell comprises the above-described membrane electrode assembly, which is a solid polymer electrolyte membrane sandwiched by electrodes and bonded together. The solid polymer fuel cell is characterized in that at least one of the electrodes comprises a catalyst layer containing: a catalyst or a catalyst supported by a carrier; and an intra-catalyst-layer electrolyte, and that the gas-phase surface of the intra-catalyst-layer electrolyte is covered with a water-repellent layer having gas-permeability. Accordingly, the membrane electrode assembly is constituted of the electrodes having the catalyst layer containing first metalloxane polymer. Here, it is further preferred that the solid polymer electrolyte membrane contain the second metalloxane polymer.

It is sufficient that the water-repellent layer is provided to either the cathode or the anode. Yet, in the case of a solid polymer fuel cell, generally, the cathode discharges more water and hence, it is preferred that the water-repellent layer be provided at least to the cathode. Also, the anode discharges part of water. Therefore, under a severely dry condition, it is more preferable that the water-repellent layer be provided to both the cathode and the anode.

Figure 6:
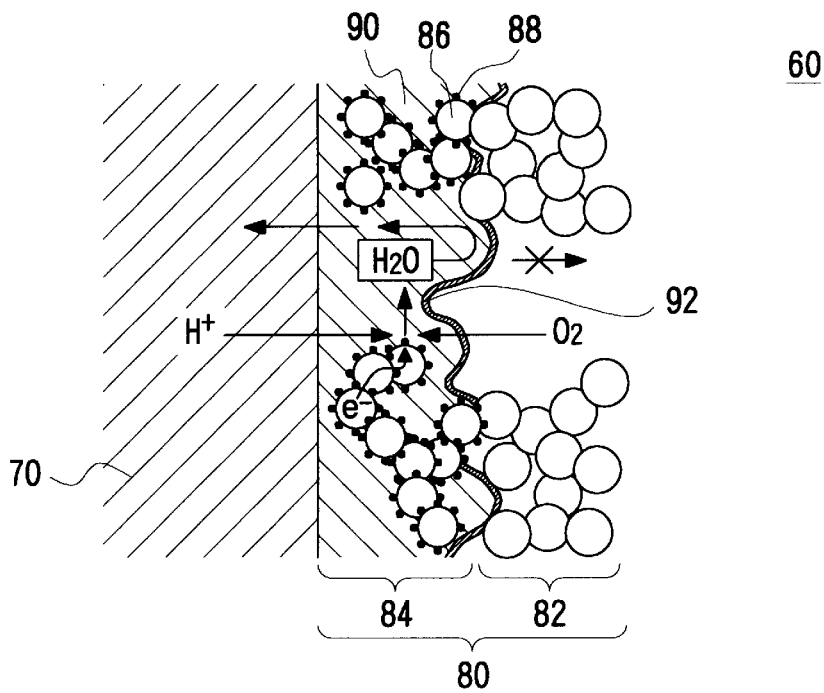
FIG. 6 is an enlarged sectional view of a membrane electrode assembly on the cathode side in a solid polymer fuel cell according to another embodiment of the present invention.

FIG. 6 shows one example of a cross sectional view of a membrane electrode assembly 60 constructed as above. In FIG. 6, the membrane electrode assembly 60 comprises a solid polymer electrolyte membrane 70 and a cathode 80 bonded to one surface of the solid polymer electrolyte membrane 70.

The cathode 80 comprises a diffusion layer 82, a catalyst layer 84, and a water-repellent layer 92. The diffusion layer 82 is the layer for supplying an oxidizing gas to, and exchanging electrons with, the catalyst layer 84, and provided on the gas side of the cathode. The material for the diffusion layer 82 is not limited to any specific one as long as it is porous and has electron conductivity. Generally, porous carbon cloth, porous carbon paper or the like is used.

The catalyst layer 84 is the layer in which electrode reaction takes place, and provided on the side in contact with the solid polymer electrolyte membrane 70. In addition, the catalyst layer 84 comprises a carrier 86 and a catalyst 88 supported by the carrier 86, and intra-catalyst-layer electrolyte 90. The materials of the carrier 86 and the catalyst 88 are not limited to any specific ones, and various materials may be used depending on the purposes. Generally, carbon is used as the carrier 86 and Pt or a Pt alloy is used as the catalyst 88. It should be noted that the catalyst 88 may be contained in the catalyst layer 84 in a state supported by the carrier 86, as shown in FIG. 6. Alternatively, the catalyst 88 may be contained in the catalyst layer 84 independently.

The intra-catalyst-layer electrolyte 90 is added in order to impart ion conductivity to the catalyst layer 84. The material for the intra-catalyst-layer electrolyte 90 is not limited to any specific one and any of various materials may be used depending on the purpose. Normally, an electrolyte having the same composition as the solid polymer electrolyte membrane 70 is used. Yet, an electrolyte having different composition may be used as well. Further, in order to form the water-repellent layer 92 on the gas-phase surface of the intra-catalyst-layer electrolyte 90, the intra-catalyst-layer electrolyte 90 may be made of a solid polymer electrolyte containing hydrophobic segments at the end of main chains or side chains solely or in combination with other electrolyte. The explanation thereof will be given later.

The water-repellent layer 92 is formed in a manner to cover the gas-phase surface of the intra-catalyst-layer electrolyte 90. The material for the water-repellent layer 92 is not limited to any specific one as long as it has the following two properties. One is oxygen permeability allowing oxygen contained in the oxidizing gas to be supplied to the catalyst layer 84, and the other is water repellency for prohibiting water from being discharged from the catalyst layer 84 to the diffusion layer 82.

Further, the thickness of the water-repellent layer 92 may be determined arbitrarily depending on the material as long as the required oxygen permeability and water repellency are ensured. For example, on condition that sufficient water repellency is acquired, the water-repellent layer 92 may be a monomolecular layer. Also, for example, on condition that sufficient oxygen permeability is acquired, the water-repellent layer 92 may be a polymer layer having a predetermined thickness.

Still further, the area of the water-repellent layer 92 is preferred to be as large as possible. The larger the area of the water-repellent layer 92 covering the gas-phase surface of the intra-catalyst-layer electrolyte 90 is, the more effectively discharge of water from the catalyst layer 84 to the diffusion layer 82 is controlled. However, in order to allow electrons to be exchanged between the catalyst layer 84 and the diffusion layer 82, the two layers need to have electrical continuity therebetween. Accordingly, it is preferred that the water-repellent layer 92 be a substantially continual layer that covers all the gas-phase surface of the intra-catalyst-layer electrolyte 90 but the surface where the catalyst 88 or the carrier 86 is in contact with the diffusion layer 82.

Specifically, suitable examples of the water-repellent layer 92 as above include: a polycondensate layer obtained by polycondensation of a hydrophobic metalloxane precursor; a basic layer obtained through acid-base reaction between the ion-exchange groups existing on the gas-phase surface of the intra-catalyst-layer electrolyte 90 and bases; and a deposit layer made of a water repellent material that has been deposited through the gas phase onto the gas-phase surface of the intra-catalyst-layer electrolyte 90. Further, instead of forming the water-repellent layer 92 with different material on the gas-phase surface of the intra-catalyst-layer electrolyte 90, it may be an uneven distribution layer of hydrophobic segments formed in the following way. That is, the intra-catalyst-layer electrolyte 90 is made of, at least partially, a solid polymer electrolyte containing hydrophobic segments bonded to the end of main chains or to side chains.

The hydrophobic segments are unevenly distributed to the gas-phase surface of the intra-catalyst-layer electrolyte 90 so as to form the uneven distribution layer of hydrophobic segments.

The above description also applies to the case of constituting an anode having a two-layer structure with a catalyst layer and a diffusion layer, and forming a water-repellent layer on the surface of an intra-catalyst-layer electrolyte. That is, as long as required hydrogen permeability and water repellency are acquired, the water-repellent layer provided to the anode may be of any of various materials having any intended thickness. In addition, the water-repellent layer of the anode is preferred to be a continues layer on condition that conductivity between the diffusion layer and the catalyst layer is ensured. Further, any of the above-described layers, namely the polycondensate layer, the basic layer, the deposit layer, or the uneven distribution layer, is used as a water-repellent layer of the anode as well.

In the case of providing the anode with a water-repellent layer, a fluorine-based material containing a C—F bond in the molecules is especially suitable as a material for the water-repellent layer. A thin layer made of the fluorine-based material has high water repellency as well as low CO gas permeability. Accordingly, by using the thin layer of the fluorine-based material as a water-repellent layer of the anode, the advantages are obtained in that CO poisoning of the catalyst of the anode is suppressed and that durability of the electrode is improved.

Similarly to a conventional membrane electrode assembly, the membrane electrode assembly 60 comprising the water-repellent layer as above is used in the condition being sandwiched between separators comprising gas passages for supplying reactive gases.

Next, description is given to working of the solid polymer fuel cell consistent with the present invention. As shown in FIG. 6, when a fuel gas containing hydrogen is supplied to the anode (not illustrated) of the membrane electrode assembly 60, protons and electrons are generated from the hydrogen in the anode. The thus generated protons transfer to the cathode 80 through the solid polymer electrolyte membrane 70, while the thus generated electrons are carried from a load (not illustrated) to the catalyst layer 84 through the diffusion layer 82 of the cathode 80.

On the other hand, when an oxidizing gas containing oxygen is supplied to the cathode 80, oxygen is delivered to the surface of the water-repellent layer 92 through the diffusion layer 82. Since the water-repellent layer 92 has oxygen permeability, oxygen passes though the water-repellent layer 92 without being hindered from diffusing and then reaches the catalyst 88 in the catalyst layer 84.

On the surfaces of the catalyst 88, water is produced from the protons, the oxygen, and the electrons. At this time, due to the high water repellency of the water-repellent layer 92, part of the thus produced water is not discharged to the diffusion layer 82 but remains in the catalyst layer 84. The residual water in the catalyst layer 84 is put back into the solid polymer electrolyte membrane 70 through diffusion, and reused to humidify the solid polymer electrolyte membrane 70. Accordingly, without an aid of auxiliary machinery for supplying makeup water externally, the water content of the solid polymer electrolyte membrane 70 is maintained at a sufficient level required for stable operation, and thus high output is produced with stability.

Further, part of the water that has been put back into the solid polymer electrolyte membrane 70 is diffused to the anode. Here, if the anode has the intra-catalyst-layer electrolyte the gas-phase surface of which is covered with a water-repellent layer, an amount of water discharged from the anode is reduced. As a result, a total amount of water discharged from the membrane electrode assembly 60 is reduced, which further facilitates no-humidification operation.

In the example described above, the electrode comprises two layers: One is the catalyst layer having the intra-catalyst-layer electrolyte the gas-phase surface of which is covered with the water-repellent layer, and the other is the diffusion layer formed outwardly next to the catalyst layer. Yet, the electrode may be of a single-phase structure only with the catalyst layer having the intra-catalyst-layer electrolyte the gas-phase surface of which is covered with the water-repellent layer. In the case of the electrode having a single-phase structure, it is preferred that the water-repellent layer be a continuous layer except the part where the catalyst or the carrier is in contact with the separator.

Next, a detailed description is given to specific examples of the water-repellent layer 92. In a first specific example, the water-repellent layer 92 comprises a polycondensate layer obtained by applying a solution containing hydrophobic metalloxane precursor onto the gas-phase surface of the intra-catalyst-layer electrolyte 90, followed by polycondensation. The hydrophobic metalloxane precursor used herein indicate a monomer or an oligomer that has a hydrophobic group and that will have a metalloxane bond resulting from polycondensation caused by sol-gel reactions. The hydrophobic metalloxane monomer is expressed in the formula 1 below, and the hydrophobic metalloxane oligomer is 2 to 200 units of hydrophobic metalloxane monomers expressed in the formula 1.

$$X_{4-n}M(OR)_n \qquad \text{Formula 1}$$

In the Formula 1, "n" is an integer of 1 to 3, and "M" is a quadrivalent semimetal element or a metal element suitable examples of which are silicon, titanium, zirconium and the like. Further, "OR" is an alkoxy group, suitable examples of which are a methoxy group, an ethoxy group, a propoxy group, a butoxy group, and the like.

In addition, as for "X" that is bonded to the element "M", it is sufficient if at least one is a hydrophobic group. Suitable example as the hydrophobic groups are an alkyl group, a cycloalkyl group, an allyl group, an aryl group, and the like in which at least one hydrogen bonded to carbon contained therein is replaced with fluorine. Further, the hydrophobic group may be a hydrocarbon group having high hydrophobic property (such as a phenyl group, an alkyl group, an allyl group, and the like). Still further, in the case where two or more hydrophobic groups are bonded to the element "M", each hydrophobic group may be of the same kind or a different kind.

Specifically, suitable examples of such hydrophobic metalloxane precursor include (3,3,3-trifluoropropyl) trimethoxysilane, (tridecafluoro-1,1,2,2-tetrahydrooctyl) triethoxysilane, (heptadecafluoro-1,1,2,2-tetrahydrodecyl) triethoxysilane, and the like as well as oligomers thereof.

In the case of applying a solution containing hydrophobic metalloxane precursor on the gas-phase surface of the intra-catalyst-layer electrolyte 90, the solution may contain one kind of metalloxane precursor, or two or more kinds of metalloxane precursors. Further, appropriate changes and adjustments may be made in the kind and the concentration of the hydrophobic metalloxane precursor contained in the solution as well as the amount of the solution to be applied in accordance with an intended thickness of the polycondensate layer to be formed, or gas-permeability and water repellency required for the polycondensate layer.

The term "to apply" used herein means to uniformly cover with a solution the gas-phase surface of the intra-catalyst-layer electrolyte 90. Specifically, suitable examples of applying include dropping, brush coating, spraying, vapor contacting, and the like. In addition, polycondensation of the hydrophobic metalloxane precursor is carried out by various methods, for example by heating, by the action of acid or alkali, rather than by a specific method.

Figure 7:
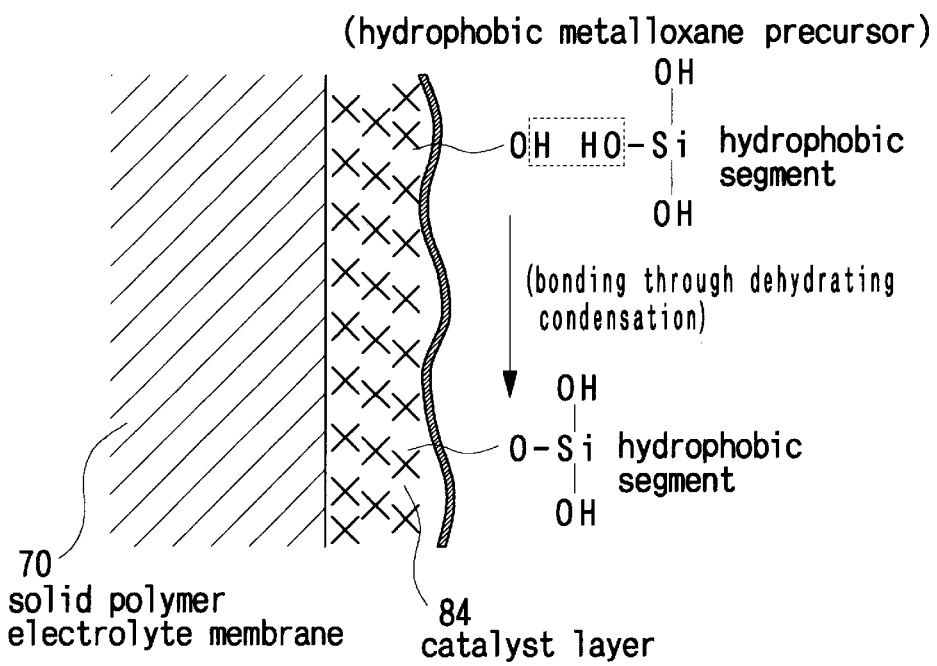
FIG. 7 is a view showing mechanism of the reaction by which the water-repellent layer is formed on the gas-phase surface of an intra-catalyst-layer electrolyte.

The mechanism of the reaction by which the water-repellent layer 92 is formed on the gas-phase surface of the intra-catalyst-layer electrolyte 90 is considered as follows. That is, as shown in FIG. 7, the catalyst layer 84 formed on the surface of the electrode (cathode) 80, which in turn formed on the surface of the solid polymer electrolyte membrane 70, contains the first metalloxane monomer or hydroxyl groups at the end of the first metalloxane polymer. Upon applying hydrophobic metalloxane precursor onto the surface of the catalyst layer 84, hydroxyl groups are generated by hydrolysis of the hydrophobic metalloxane precursor, followed by dehydrating condensation with the first metalloxane monomer or hydroxyl groups so as to be bonded to each other. As a result, the water-repellent layer 92 constituted from the hydrophobic metalloxane is formed on the surface of the catalyst layer 84.

If the ion-exchange groups are exposed on the gas-phase surface of the intra-catalyst-layer electrolyte 90, water is apt to be discharged to the diffusion layer 82 through the ion-exchange groups. On the contrary, if the gas-phase surface of the intra-catalyst-layer electrolyte 90 is covered with a polycondensate layer of the hydrophobic metalloxane precursor, discharge of water from the catalyst layer 84 to the diffusion layer 82 is suppressed. The part where the ion-exchange groups are exposed tends to serve as a water discharge exit. Yet, since the water-repellent layer is formed selectively by catalyst action of the ion-exchange groups and water existing in that part, discharge of water is suppressed effectively. In addition, the polycondensate layer as above has gas-permeability, and therefore, does not obstruct diffusion of the reactant gas to the catalyst layer 84. Therefore, a fuel cell obtained thereby operates with stability even under a no-humidification condition.

Next, description is given to a second specific example. The water-repellent layer 92 of the second specific example is constituted of a basic layer formed through acid-base reaction between the ion-exchange groups existing on the gas-phase surface of the intra-catalyst-layer electrolyte 90 and bases. Suitable examples of the bases used to make reaction with the ion-exchange groups include quaternary ammonium salt expressed in the formula 2 below.

$(R_4N)Y$  Formula 2

In the Formula 2, "R" is an alkyl group, an allyl group, an aryl group, or the like generally. Yet, its structure is not limited to any specific one and various kinds of quaternary ammonium salts may be used. In order to make the basic-layer highly water repellent, "R" is suitably a hydrophobic group such as an alkyl group, an allyl group, an aryl group, and the like described above in which at least one hydrogen bonded to carbon contained therein is replaced with fluorine. Here, each "R" which bonds to a nitrogen atom may be of the same kind or a different kind. Further, "Y" is an anion and there is no specific limitation regarding the kind of the anion.

Specifically, suitable examples of the base as above include dodecyl trimethylammonium chloride, distearyldimethylammonium chloride, 3,3,3-trifluoropropyltrimethyl ammonium chloride, and the like.

In order to cause acid-base reactions between the ion-exchange groups existing on the gas-phase surface of the intra-catalyst-layer electrolyte 90 and bases, a solution containing bases is applied onto the gas-phase surface of catalyst layer 84. In this case, appropriate changes and adjustments may be made in the kind of the base contained in the solution, the concentration of the solution, the amount of the solution to be applied, and the like in accordance with gas-permeability and water repellency required for the basic layer.

Through acid-base reaction of the ion-exchange groups exist on the gas-phase surface of the intra-catalyst-layer electrolyte 90 with the bases, the ion-exchange groups are blocked by the bases so as to suppress discharge of water from the catalyst layer 84 to the diffusion layer 82. Especially when the bases containing hydrophobic groups are used, advantages are not only that the ion-exchange groups are blocked, but also that the hydrophobic groups impart high water repellency to the basic layer. Further, the basic layer as above has gas-permeability, and therefore, does not obstruct diffusion of the reactant gas to the catalyst layer 84. It goes without saying that only the ion-exchange groups existing on the gas-phase surface are selectively made to be water repellent so that the ion-exchange groups existing inside maintain sufficient proton conductivity, which is atheir original function.

Next, description is given to a third specific example. The water-repellent layer 92 of the third specific example is constituted of a deposit layer formed with a water repellent material having gas-permeability that is deposited on the gas-phase surface of the intra-catalyst-layer electrolyte 90. Specifically, suitable examples of the material for the deposit layer include $CF_4$, polytetrafluoroethylene (hereinafter referred to as "PTFE"), pitch fluoride, and the like.

Further, gas-phase deposition may be carried out by various methods depending on the kind of the water repellent material used. For example, in the case of using $CF_4$ as the water repellent material, a plasma treatment is suitable. By conducting the plasma treatment on the gas-phase surface of the intra-catalyst-layer electrolyte 90 using $CF_4$, a carbon fluoride coating layer is formed with a monolayer structure or a multilayer structure depending on the treatment condition, to cover the gas-phase surface of the intra-catalyst-layer electrolyte 90.

Alternatively, in the case of using PTFE as the water repellent material, a sputtering method is suitable. By conducting PTFE sputtering on the surface of the intra-catalyst-layer electrolyte 90, a PTFE coating layer is formed in an intended thickness depending on the sputtering condition, to cover the gas-phase surface of the intra-catalyst-layer electrolyte 90.

Alternatively, in the case of using pitch fluoride as the water repellent material, a vapor contacting method is suitable. By making vapor contact between pitch fluoride and the intra-catalyst-layer electrolyte 90, a pitch fluoride coating layer is formed in an intended thickness depending on the contacting condition, to cover the gas-phase surface of the intra-catalyst-layer electrolyte 90.

In general, fluorine-based water repellent materials are solvent-resistant. Hence, the method to apply a solution is not suitable to form a coating layer in a uniform thickness on the gas-phase surface of the intra-catalyst-layer electrolyte 90 with such a water repellent material. Unlike this method, by using the deposition method via the gas phase, a uniform coating layer may be formed along microscopic asperities on the surface of the intra-catalyst-layer electrolyte 90. Furthermore, the deposit layer formed by the above method has gas-permeability, and therefore, does not obstruct diffusion of the reactant gas to the catalyst layer 84.

Next, description is given to a fourth specific example. The water-repellent layer 92 of the fourth specific example is constituted of an uneven distribution layer of hydrophobic segments formed in the following way. That is, as the intra-catalyst-layer electrolyte 90, a solid polymer electrolyte containing hydrophobic segments at the end of the main chains or at side chains (hereinafter referred to as a "hydrophobic electrolyte") are used. Then, the hydrophobic segments are unevenly distributed on the gas-phase surface thereof so as to form the uneven distribution layer of hydrophobic segments.

The hydrophobic segments used herein refer to atomic groups expressed by the general formula: $CF_3-(CF_2)_n-$. The hydrophobic segments may be straight chain segments, or segments with branches are totally acceptable as well. Generally, the greater the value of "n" is, the higher the water repellency of the hydrophobic segments tends to be. On the other hand, the value of "n" exerts almost no effect on the gas-permeability. Therefore, the value of "n" may be determined arbitrarily with the view of required water repellency and easy manufacturing of the hydrophobic electrolyte. In order to make the uneven distribution layer highly water repellent, the value of "n" is preferably 2 or greater, and more preferably 10 or greater. However, when the value of "n" exceeds 200, the solubility decreases, which makes it difficult to form the catalyst layer. Accordingly, it is preferred that the value of "n" be 200 or less.

There is no other specific limitation than the limitation regarding the hydrophobic segments of the hydrophobic electrolyte. That is, the hydrophobic electrolyte may be constituted of a solid polymer electrolyte with a polymer main chain entirely or partially fluorinated, and containing hydrophobic segments bonded to the end of main chains or to side chains of the electrolyte. Alternatively, the hydrophobic electrolyte may be constituted of a hydrocarbon-based solid polymer electrolyte that is not fluorinated and contains hydrophobic segments bonded to the end of main chains or to side chains thereof.

Specifically, suitable examples of such a hydrophobic electrolyte includes a perfluorocarbon sulfonic acid polymer having hydrophobic segments bonded to the end of main chains or to side chains thereof. The intra-catalyst-layer electrolyte 90 may be constituted solely of a hydrophobic electrolyte, or of a mixture of a hydrophobic electrolyte and an electrolyte having no hydrophobic segments.

In order to form the catalyst layer 84, first, a mixture solution of: the intra-catalyst-layer electrolyte 90 containing a hydrophobic electrolyte; and a catalyst or a catalyst supported by a carrier is applied onto the surface of the solid polymer electrolyte membrane 70 and then the solvent is vaporized. At the time of vaporizing the solvent, the hydrophobic segments are arranged along the gas-phase surface of the intra-catalyst-layer electrolyte 90 so as to form the uneven distribution layer of the hydrophobic segments on the gas-phase surface of the intra-catalyst-layer electrolyte 90. The uneven distribution layer formed as above has water repellency and also gas-permeability so that the uneven distribution layer can suppress discharge of water to the diffusion layer 82 without obstructing diffusion of reactant gas to the catalyst layer 84.

Next, description is given to a method for manufacturing a solid polymer fuel cell comprising an electrode having a catalyst layer the gas-phase surface of which is covered with the water-repellent layer 92 as described above. The solid polymer fuel cell having such a structure may be manufactured by various methods. In a first manufacturing method, first, the solid polymer electrolyte membrane 70 containing the second metalloxane monomer is prepared, and the catalyst layers 84 containing the first metalloxane monomer are formed on both surfaces of the solid polymer electrolyte membrane 70, followed by thermal polycondensation between the first metalloxane monomer and the second metalloxane monomer to obtain, as a result, a membrane electrode assembly in which both the first metalloxane monomer and the second metalloxane monomer are polymerized. Then, the water-repellent layer 92 is formed in a uniform thickness on the gas-phase surface of each intra-catalyst-layer electrolyte 90 by any of the above-described methods. Finally, the diffusion layer 82 is formed on the surface of each catalyst layer 84. In this case, the first metalloxane monomer contained in the catalyst layer 84 and the second metalloxane monomer contained in the solid polymer electrolyte membrane 70 may be polymerized prior to thermal bonding. In addition, the diffusion layer 82 and the catalyst layer 84 may be bonded together, or they may be simply brought into contact with each other by fastening at the time of cell assembling.

In the case where the carrier 86 or the catalyst 88 contained in the catalyst layer 84 is totally covered with the intra-catalyst-layer electrolyte 90, the water-repellent layer 92 is formed in a uniform thickness on the gas-phase surface of the intra-catalyst-layer electrolyte 90 and then bonding or fastening of the diffusion layer 82 is performed. In this way, protrusions on the diffusion layer 82 pierce through the water-repellent layer 92 and the intra-catalyst-layer electrolyte 90 so that the catalyst layer 84 and the diffusion layer 82 are brought into electrical contact with each other. By sandwiching the membrane electrode assembly 60 as above with separators having reactant gas passages, a solid polymer fuel cell capable of driving with stability even under a no-humidification condition is obtained In a second manufacturing method, first, the catalyst layer 84 is formed to contain the first metalloxane monomer in a sheet-like form, and then the water-repellent layer 92 is formed in a uniform thickness on the surface of the intra-catalyst-layer electrolyte 90, which in turn formed on the surface of the sheet-like catalyst layer 84 by any of the above-described methods. Thereafter, the catalyst layer 84 the surface of which is covered with the water-repellent layer 92 is bonded to the solid polymer electrolyte membrane 70 containing the second metalloxane monomer, followed by polycondensation of the first metalloxane monomer and the second metalloxane monomer to polymerize them. Thereafter, the diffusion layer 82 is further formed on the surface of the catalyst layer 84. In this case, too, the first metalloxane monomer contained in the catalyst layer 84 and the second metalloxane monomer contained in the solid polymer electrolyte membrane 70 may be polymerized prior to bonding. In addition, the diffusion layer 82 and the catalyst layer 84 may be bonded together or simply brought into contact by fastening.

In a third manufacturing method, first, the catalyst layer 84 containing the first metalloxane monomer as above is formed on the surface of the solid polymer electrolyte 70 containing the second metalloxane monomer as above, followed by polymerization of the first metalloxane monomer and the second metalloxane monomer by polycondensation. Then, the diffusion layer 82 is formed on the catalyst layer 84. Thereafter, the water-repellent layer 92 is formed on the gas-phase surface of the intra-catalyst-layer electrolyte 90 by conducting for example: impregnation and polycondensation of hydrophobic metalloxane precursor; treatment using bases; deposition of a water repellent material; or the like on the side of the diffusion layer 82. A solid polymer fuel cell obtained according to this method, too, operates with stability even under a no-humidification condition.

In a fourth manufacturing method, first, in the electrode preparing step, the catalyst layer 84 containing the first metalloxane monomer is formed on the diffusion layer 82, followed by polymerization of the first metalloxane monomer by thermal polycondensation. Then, the water-repellent layer 92 is formed on the gas-phase surface of the intra-catalyst-layer electrolyte 90, followed by bonding to the electrolyte membrane 70 from the side of the catalyst layer 84. Here, the following is also applicable. That is, in the electrode preparing step, the electrode is constituted to comprise the catalyst layer 84 on the surface of the diffusion layer 82. The thus obtained electrode may be bonded to the solid polymer electrolyte membrane 70 first, and then the water-repellent layer 92 may be formed on the surface of the intra-catalyst-layer electrolyte 90 from the side of the diffusion layer 82.

In the manufacturing methods described above, the electrode has a two-layer structure with the catalyst layer 84 and the diffusion layer 82. Yet, there may be the case where the catalyst layer 84 covered with the water-repellent layer 92 is used as the electrode. In that case, the step of manufacturing the diffusion layer 82 on the surface of the catalyst layer 84 is omitted and a step of forming a passage for electron conduction is added. Yet, other than the above two points, the same manufacturing method is still applicable.

EXAMPLE 1

A solid polymer electrolyte membrane containing tetraethoxysilane (hereinafter, referred to as "TEOS") as the second metalloxane monomer was manufactured by the following method. First, an electrolyte membrane of perfluorocarbon sulfonic acid (Nafion (a registered trademark for products manufactured by E.I. du Pont de Nemours and Company) N112) was used as the solid polymer electrolyte membrane. In order to make the membrane perfect protonic type, organic substances and the like contained in the membrane needed to be removed. To meet this end, the membrane was boiled successively in an aqueous solution containing 6 wt % of $H_2O_2$, an aqueous solution containing 1.0 mole of $H_2SO_4$, and pure water, followed by drying.

Next, the thus obtained electrolyte membrane was immersed in an aqueous solution containing 67 vol % of 2-propernol for one night, and then immersed in an aqueous solution containing 30 vol % of TEOS/2-propernol for ten minutes. Thereafter, the electrolyte membrane was vacuum dried.

Next, an electrode comprising a catalyst layer that contained TEOS as the first metalloxane monomer was manufactured. To be more specific, a mixture paste of Pt/C and Nafion solution (manufactured by Aldrich Co.) in concentration of 5 wt % in a 1:9 ratio by weight was prepared. Thereafter, TEOS was further added to the paste and mixed uniformly. The thus obtained paste was applied onto one surface of a diffusion layer (a gas diffusion electrode manufactured by E-TEK) to constitute an electrode.

As shown in FIG. 1, the electrodes 10 was constituted of the diffusion layer 12 and the catalyst layer 14 containing TEOS 32a that is formed on one surface of the diffusion layer 12. The electrodes 10 were placed on both surfaces of the solid polymer electrolyte membrane 22 containing TEOS 32b in a manner to bring the catalyst layers 14 into intimate contact with the solid polymer electrolyte membrane 22, followed by hot-pressing. In this way, the electrodes 10 and the solid polymer electrolyte membrane 22 were bonded together, and simultaneously, polycondensation between TEOS 32a and 32b took place. As a result, the membrane electrode assembly 40 containing siloxane polymers 34a and 34b respectively in each electrode 10 and the solid polymer electrolyte membrane 22 was obtained. In the case of this example, the catalyst layer 14 contained the siloxane polymer 34a of 16 wt % (This is the content by weight percent of the siloxane polymer 34a against the total weight of the siloxane polymer 34a contained in the catalyst and the intra-catalyst-layer electrolyte exclusive of the catalyst.) The solid polymer electrolyte membrane 22 contained the siloxane polymer 34b of 10 wt % (This is the content by weight percent of the siloxane polymer 34b against the total weight of the siloxane polymer 34b contained in the solid polymer electrolyte membrane and the solid polymer electrolyte membrane.)

COMPARATIVE EXAMPLE 1

Figure 2:
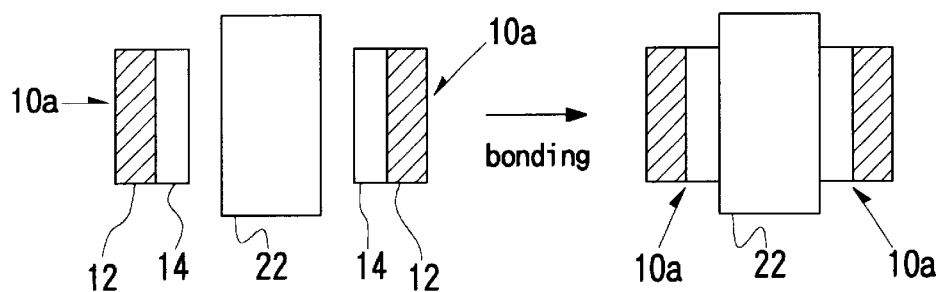
FIG. 2 is a view for illustrating steps of a method for manufacturing a membrane electrode assembly as a comparative example 1.

Electrodes and a solid polymer electrolyte membrane were manufactured following the same procedures as the Example 1 except that the solid polymer electrolyte membrane was not impregnated with TEOS and that TEOS were not added to the catalyst layer. As shown in FIG. 2, the electrode 10a was constituted of the diffusion layer 12 and the catalyst layer 14 containing no TEOS formed on one surface of the diffusion layer 12. As a next step, the electrodes 10a were placed on both surfaces of the solid polymer electrolyte membrane 22 containing no TEOS in a manner to bring the catalyst layers into intimate contact with the solid polymer electrolyte membrane 22, followed by hot-pressing. As a result, the membrane electrode assembly 42 that contained no siloxane polymers either in the electrodes 10a or the solid polymer electrolyte membrane 22 was obtained.

COMPARATIVE EXAMPLE 2

Figure 3:
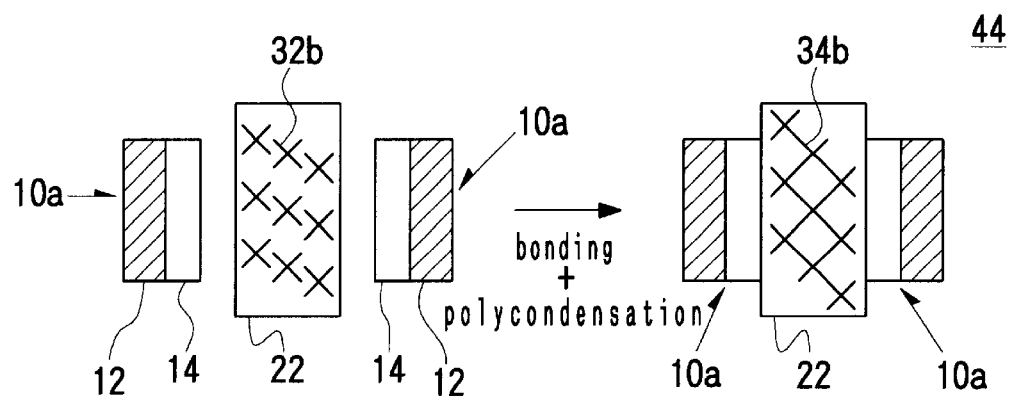
FIG. 3 is a view for illustrating steps of a method for manufacturing a membrane electrode assembly as a comparative example 2.

Following the same procedures as the Example 1, the solid polymer electrolyte membrane was impregnated with TEOS, and then vacuum dried. Also, the electrode was manufactured following the same procedures as the Example 1 except that TEOS was not added thereto. Next, as shown in FIG. 3, the electrode 10a each comprising the catalyst layer 14 which contained no TEOS was brought into intimate contact with each surface of the solid polymer electrolyte membrane 22 which contained TEOS. As a result, the membrane electrode assembly 44 that contained the siloxane polymer 34b only in the solid polymer electrolyte membrane 22 was obtained. In the case of this comparative example, the solid polymer electrolyte membrane 22 contained the siloxane polymers 34b of 10 wt % (See above for the description of this content by weight percent.)

Fuel cells were manufactured using the electrode-electrolyte membrane assemblies obtained in the Example 1, the Comparative Example 1, and the Comparative Example 2 and their stability of voltage and resistance were examined. Here, the area of each electrode was made to be 13 $cm^2$ and the current density was maintained at 0.9 A/$cm^2$. In addition, a hydrogen gas was supplied to the anode as a fuel gas, while air was supplied to the cathode as an oxidizing gas.

Figure 4:
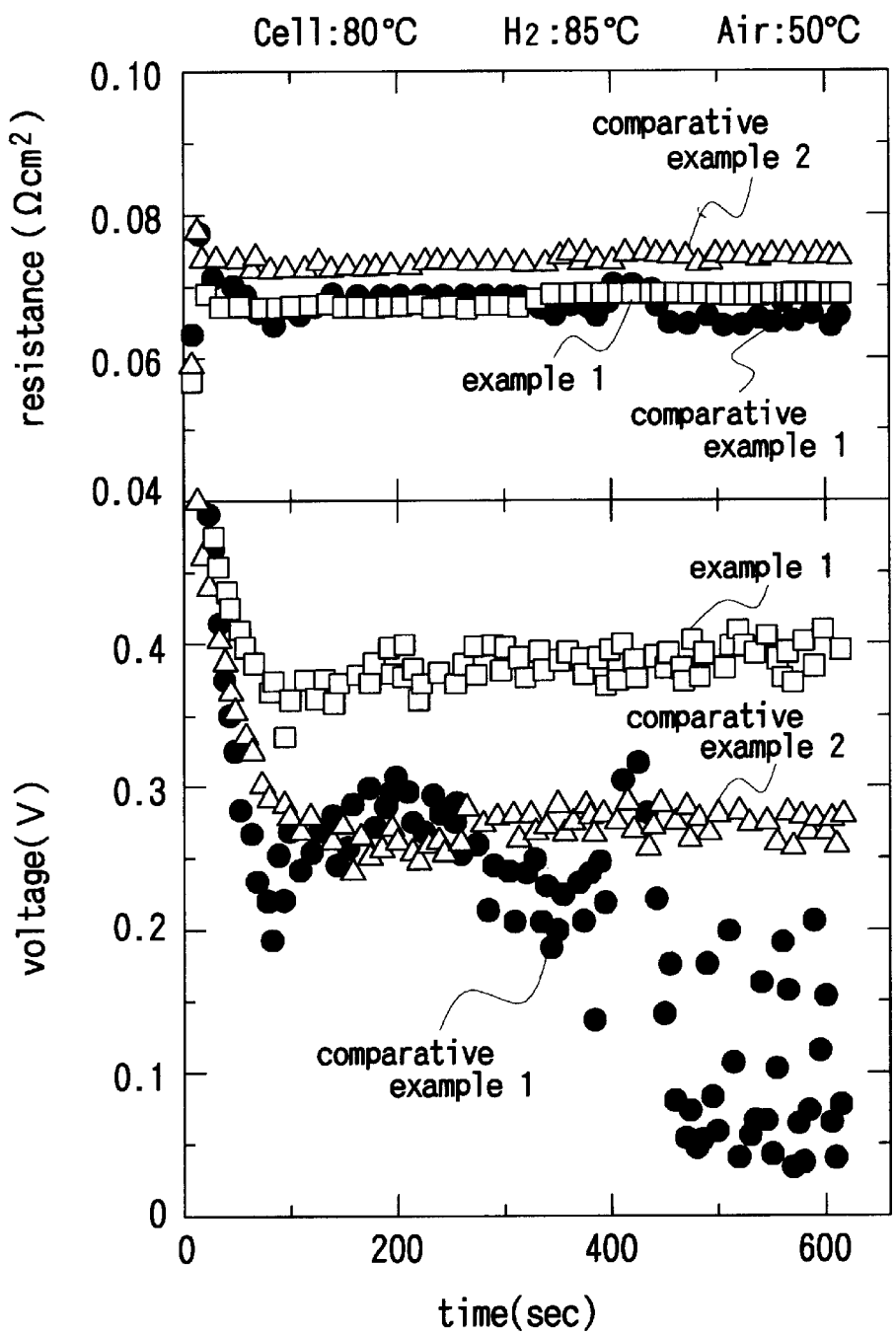
FIG. 4 is a graph showing a time-varying change under a wet condition in voltage and resistance of membrane electrode assemblies obtained in an example 1 of the present invention, and the comparative examples 1 and 2.

In addition, the stability of voltage and resistance were examined under the two conditions: the wet condition in which a reactant gas having high humidity was supplied to the electrode; and the dry condition in which a reactant gas having low humidity was supplied to the electrode. Further, in the case of the wet condition, the cell was set at a temperature of 80° C., and the hydrogen gas and the air were set at temperatures of 85° C. and 50° C. respectively. In the case of the dry condition, the cell was set at a temperature of 80° C., and the hydrogen gas and the air were set at temperatures of 70° C. and 30° C. respectively FIG. 4 shows the stability of voltage and resistance under the wet condition. Under the wet condition, the resistance did not vary with a lapse of time either in the Example 1, the Comparative Examples 1, or the Comparative Example 2, and all exhibited low resistance with stability.

However, in the case of the membrane electrode assembly of the Comparative Example 1, which contained no siloxane polymer either in the electrode or the solid polymer electrolyte membrane, the output voltage dropped with a lapse of time, and moreover, the output voltage value greatly fluctuated. This is ascribable to that water in the membrane was made to distribute unevenly due to electroosmosis of water, and that flooding occurred at the electrode by supplying the reactant gas having high humidity.

On the other hand, in the case of the membrane electrode assembly of the Comparative Example 2, which contained siloxane polymer only in the solid polymer electrolyte membrane, the voltage did not vary much with a lapse of time and generally constant voltage was produced with stability. This is ascribable to the following reasons. That is, the siloxane polymer that was introduced into the solid polymer electrolyte membrane served to suppress electroosmosis of water so that water in the membrane was made to distribute evenly. However, the output voltage value remained 0.25 to 0.30 (V), which meant the performance capability of the fuel cell was not greatly improved.

On the other hand, in the case of the membrane electrode assembly of the Example 1, which contained siloxane polymers both in the electrode and the solid polymer electrolyte membrane, the voltage did not vary much with a lapse of time, and generally constant voltage was produced with stability. Moreover, the voltage value was 0.35 to 0.40 (V), which meant that the performance capability of the fuel cell was greatly improved in comparison with the Comparative Example 2. This is ascribable to the following reasons. That is, because of the siloxane polymers that were introduced into the solid polymer electrolyte membrane, the water in the solid polymer electrolyte membrane was made to distribute evenly. In addition, the siloxane polymers served to promote mass transfer at the interface between the solid polymer electrolyte membrane and the intra-catalyst-layer electrolyte as well as at the interface between the intra-catalyst-layer electrolyte and the gas phase, and thus to suppress flooding.

Figure 5:
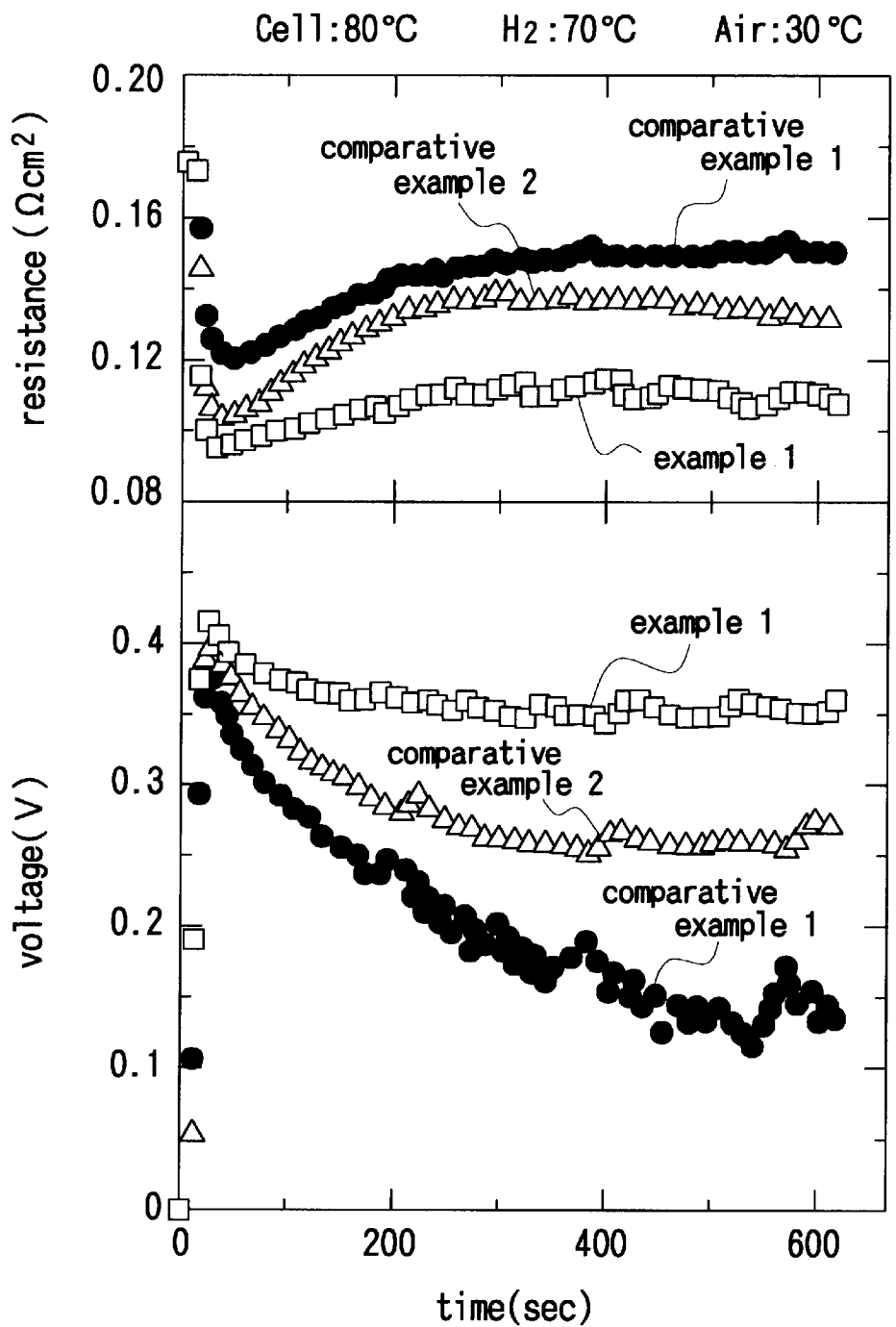
FIG. 5 is a graph showing a time-varying change under a dry condition in voltage and resistance of the membrane electrode assemblies obtained in the example 1, the comparative examples 1 and 2.

FIG. 5 shows the stability of voltage and resistance under the dry condition. Under the dry condition, the membrane electrode assembly of the Comparative Example 1 exhibited increase in the resistance with a lapse of time. The voltage was about 0.4 (V) immediately after starting the operation, yet dropped with a lapse of time. After a lapse of 600 seconds, the voltage was dropped to as low as about 0.15 (V).

On the other hand, the membrane electrode assembly of the Comparative Example 2 exhibited almost the same tendency as the Comparative Example 1 in that the resistance increased with a lapse of time. However, the voltage did not drop as much as the Comparative Example 1 and maintained the value ranging from 0.25 to 0.30 (V) even 600 seconds after starting the operation. This is ascribable to that the siloxane polymers contained in the solid polymer electrolyte membrane served to suppress electroosmosis of water so that distribution of water was maintained uniformly.

In comparison with the Comparative Examples, in the case of the membrane electrode assembly of the Example 1, no change in the resistance was observed and the resistance was maintained at low. In addition, drop in the voltage was even lesser than that of the Comparative Example 2. The voltage was maintained as high as the value ranging from 0.35 to 0.40 (V) even 600 seconds after starting the operation. This is ascribable to the following reasons. That is, because of the siloxane polymer contained in the solid polymer electrolyte membrane, the water distribution in the membrane was maintained uniformly. In addition, the siloxane polymer contained in the catalyst layer served as a buffer phase for water so that dry-up of the anode and the solid polymer electrolyte were suppressed.

EXAMPLE 2

A solid polymer electrolyte membrane containing TEOS as the second metalloxane monomer was manufactured by the following method. First, an electrolyte membrane of perfluorocarbon sulfonic acid (Nafion (a registered trademark for products manufactured by E.I. du Pont de Nemours and Company) N112) was used as the solid polymer electrolyte membrane. In order to make the membrane perfect protonic type, organic substances and the like contained in the membrane needed to be removed. To meet this end, the membrane was boiled successively in an aqueous solution containing 6 wt % of $H_2O_2$, an aqueous solution containing 1.0 mole of $H_2SO_4$, and pure water, followed by drying.

Next, the thus obtained electrolyte membrane was immersed in an aqueous solution containing 67 vol % of 2-propernol for one night, and then immersed in an aqueous solution containing 30 vol % of TEOS/2-propernol for ten minutes. Thereafter, the electrolyte membrane was vacuum dried.

Next, a catalyst layer containing TEOS as the first metalloxane monomer was manufactured in the following procedures. That is, a paste was prepared by mixing Pt/C and a Nafion solution (manufactured by E.I. du Pont de Nemours and Company) of 25 wt % concentration was mixed in proportions of 1:2 by weight. Then, TEOS was further added to the paste and mixed uniformly. Thereafter, the paste was applied onto a tetrafluoroethylene sheet and the thus prepared sheets were placed on both surfaces of the solid polymer electrolyte membrane containing TEOS in a manner to make intimate contact therebetween, followed by hot-pressing (140° C., 4.9 MPa). Further, only on the catalyst layer of the anode, the diffusion layer (manufactured by E-TEK) was formed and hot-pressed (140° C., 7.35 MPa).

Next, 300 $\mu l$ of the solution (fluorine-based solvent) containing (3,3,3-trifluoropropyl) trimethoxysilane (manufactured by CHISSO Corp.) was uniformly dropped over the surface of the catalyst layer constituting the cathode. Next, the diffusion layer was overlaid onto the catalyst layer constituting the cathode, followed by hot-pressing (140° C., 7.35 MPa). As a result, bonding of the diffusion layer and polycondensation of (3,3,3-trifluoropropyl) trimethoxysilane were simultaneously carried out.

In this way, the electrodes and the solid polymer electrolyte membrane were bonded together to obtain the membrane electrode assembly that contained siloxane polymers in both electrodes, and that the gas-phase surface of the intra-catalyst-layer electrolyte of the cathode was covered with hydrophobic siloxane polymer coating. The thus obtained membrane electrode assembly was sandwiched between separators having reactant gas passages to obtain a solid polymer fuel cell.

COMPARATIVE EXAMPLE 3

A solid polymer fuel cell was manufactured following the same procedures as the Example 2 except that TEOS was added neither to the catalyst layer not to the electrolyte membrane, and that dropping of (3,3,3-trifluoropropyl) trimethoxysilane was omitted.

The solid polymer fuel cells of the Example 2 and the Comparative Example 3 were subjected to trap experiments in which the amounts of water discharged form the cathodes and the anodes were measured. The trap experiments were conducted under the following conditions: hydrogen and air were used as the fuel gas and the oxidizing gas respectively; neither electrode was humidified; the cell temperature was set at 80° C.; the current density was 0.5 A/cm$^2$; the fuel stoichiometry was 2; and the air stoichiometry was 1.77. Under these conditions, the fuel cells were operated for three hours continuously to measure the amounts of water discharged from the cathodes and the anodes during the operation. The measured values are shown in the Table 1. Further, the voltage and the resistance of the cells were measured successively during the operation. The averages of the measured values are shown in the Table 2.

TABLE 1

| | Water Amount(g) in Trap Experiment (Neither Electrode was Humidified) | | |
|---|---|---|---|
| | Cathode | Anode | Total |
| Example 2 | 5.43 (80%) | 1.36 (20%) | 6.79 |
| Comparative Example 3 | 5.87 (86%) | 0.95 (14%) | 6.82 |

TABLE 2

| | Voltage and Resistance in Trap Experiment (Neither Electrode was Humidified) | |
|---|---|---|
| | Voltage (V) | Resistance (Ω) |
| Example 2 | 0.53 | 0.014 |
| Comparative Example 3 | 0.50 | 0.020 |

As is clear from the Table 1, the Example 2 of which cathode comprising the water-repellent layer formed on the surface of the catalyst layer is smaller in the percentage of the water discharge from the cathode for the total amount of water discharge. This is because the water-repellent layer formed on the surface of the intra-catalyst-layer electrolyte in the cathode suppressed discharge of the generated water from the cathode to the gas phase and, as a result, the water diffused into the anode to a greater extent.

As is also clear from Table. 2, the Example 2 exhibited higher voltage and lower resistance. This is because that the water-repellent layer in the cathode did not obstruct diffusion of oxygen. In addition, it is also because part of the generated water that was not discharged from the cathode was reused for humidification of solid polymer electrolyte membrane so that the water content of the solid polymer electrolyte membrane was maintained in an adequate state.

Figure 8:
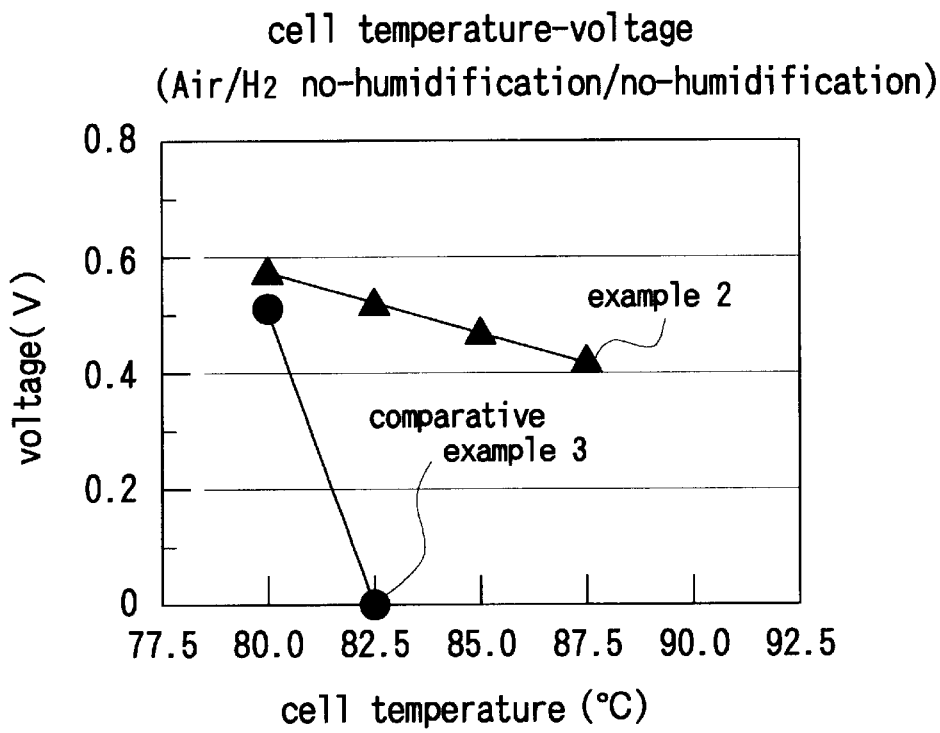
FIG. 8 is a graph showing the relation between the temperature of the cell and the voltage under a no-humidification condition in comparison between an example 2 and a comparative example 3.
Figure 9:
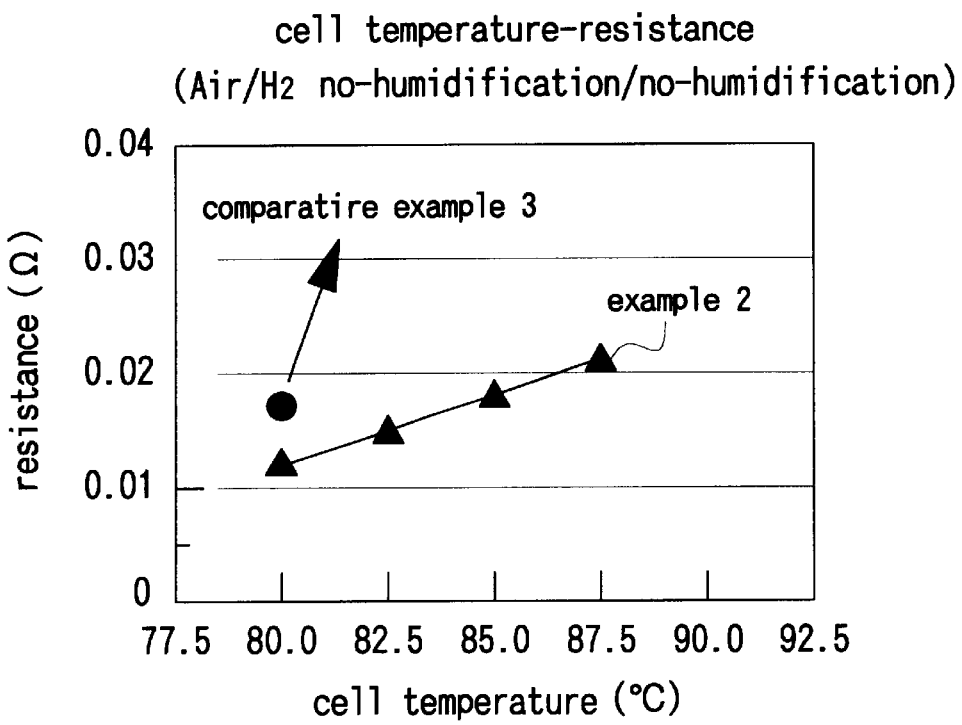
FIG. 9 is a graph showing the relation between the temperature of the cell and the resistance under a no-humidification condition in comparison between the example 2 and the comparative example 3 similarly to FIG. 8.

Next, the fuel cells of the Example 2 and the Comparative Example 3 were operated under no-humidification conditions at a different cell temperature to examine the changes in the voltage and the resistance. The operation conditions in this experiment were as follows: hydrogen and air were used as the fuel gas and the oxidizing gas respectively; neither electrode was humidified; the current density was 0.5 A/cm$^2$; the fuel stoichiometry was 1.2; and the air stoichiometry was 1.77. The cell temperature was raised by 2.5° C. at a time interval of 30 minutes. FIG. 8 shows the relation between the cell temperature and the voltage, while FIG. 9 shows the relation between the cell temperature and the resistance.

At the cell temperature of 80° C., the Comparative Example 3 generated electric power with stability even under the condition where neither electrode was humidified. However, when the cell temperature was raised to 82.5° C., the resistance increased abruptly and no output voltage was produced. On the contrary, the Example 2 produced the output voltage of about 0.4 V at a temperature up to 87.5° C. although the resistance increased and the voltage dropped with the rise of cell temperature.

From the results stated above, the following is apparent. That is, the water-repellent layer formed on the gas-phase surface of the intra-catalyst-layer electrolyte of the cathode served to maintain the water content of the solid polymer electrolyte membrane in an adequate state by the product-water, and to obtain high and stable output even under no-humidification condition with no external humidification. Further, it is also apparent that the water content of the solid polymer electrolyte was maintained at an adequate condition even at a high cell temperature.

Up to this point, descriptions have been given to the preferred embodiments of the present invention in detail. Yet, the foregoing description does not limit the invention to the precise embodiments disclosed above. Many modifications and variations are possible without departing from the spirit and principle of the present invention.

For example, in the above-preferred embodiments, the descriptions have been given mainly to the membrane electrode assembly formed by introducing metalloxane polymer into both the electrode and the solid polymer electrolyte membrane. Yet, it is also applicable to introduce metalloxane polymer only into at least one of the catalyst layers.

Further, in the Example 1 described above, the catalyst layer was formed on the diffusion layer to be bonded to the solid polymer electrolyte membrane. In the Example 2, a catalyst layer was manufacture alone to be transferred to the solid polymer electrolyte membrane, and then bonded to the diffusion layer. In addition, other various methods are also applicable. For example, a catalyst layer paste maybe applied on the surface of the solid polymer electrolyte membrane, and then the diffusion layer may be bonded thereto at the catalyst layer.

Further, although the membrane electrode assembly is especially suitable for manufacturing a fuel cell, applications of the present invention are not limited to a fuel cell. The membrane electrode assembly of the present invention may as well be used for water electrolysis, hydrogen halogenide electrolysis, electric soda process, an oxygen concentrator, a humidity sensor, a gas sensor, and the like.

Still further, in the above-preferred embodiment, the description was given to the examples in which the electrolyte of cation-exchange type was used as the solid polymer electrolyte membrane. Yet, an electrolyte membrane of anion-exchange type may equally be used as the solid polymer electrolyte membrane. The technique to allow no-humidification operation of electrolytes consistent with the present invention is especially useful to a solid polymer fuel cell. Yet, the technique of the present invention is equally applicable to other kinds of fuel cells (for example, a phosphoric acid fuel cell, an alkaline fuel cell, and the like).

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A membrane electrode assembly having electrodes respectively bonded to both surfaces of a solid polymer electrolyte membrane having a first conductive path, the electrodes each having a catalyst layer, an intra-catalyst-layer electrolyte and a second conductive path, wherein the catalyst layer of at least one of the electrodes contains a first metalloxane polymer in the intra-catalyst-layer electrolyte and an electrode catalyst.

2. The membrane electrode assembly according to claim 1, wherein the catalyst layer containing the first metalloxane polymer has a network structure of the metalloxane polymer introduced into the second conductive path.

3. The membrane electrode assembly according to claim 1, wherein the intra-catalyst-layer electrolyte contains the first metalloxane polymer in an amount of 0.5 to 50 wt % of the total weight of the intra-catalyst-layer electrolyte and the first metalloxane polymer contained therein exclusive of the electrode catalyst.

4. The membrane electrode assembly according to claim 1, wherein the first metalloxane polymer is formed from a polycondensate of at least one member selected from a group consisting of silicon-based alkoxides, titanium-based alkoxides, and zirconium-based alkoxides.

5. The membrane electrode assembly according to claim 4, wherein the silicon-based alkoxides comprise at least one member selected from a group consisting of tetramethoxysilane, tetraethoxysilane, methyltrimethoxysilane, methyltriethoxysilane, ethyltrimethoxysilane, ethyltriethoxysilane, dimethyldimethoxysilane, dimethyldiethoxysilane, phenyltrimethoxysilane, phenyltriethoxysilane, dimethoxydiphenylsilane, diethoxydiphenylsilane, dimethoxymethylphenylsilane, diethoxymethylphenylsilane, phenethyltrimethoxysilane, phenethyltriethoxysilane, and derivatives thereof.

6. The membrane electrode assembly according to claim 1, wherein the solid polymer electrolyte membrane is formed from at least one member selected from a group consisting of: a perfluorocarbon sulfonic acid-based polymer, a perfluorocarbon phosphonic acid-based polymer, a trifluorostyrene sulfonic acid-based polymer, and an ethylenetetrafluoroethylene-g-styrenesulfonic acid-based polymer, each of which is fluorine-based and has a polymer main chain entirely or partially fluorinated; and a polysulfone sulfonic acid, a polyaryletherketone sulfonic acid, a polybenzimidazole alkylsulfonic acid, and a polybenzimidazole alkylphosphonic acid, each of which is hydrocarbon-based and has no fluorine.

7. The membrane electrode assembly according to claim 6, wherein the solid polymer electrolyte membrane contains a second metalloxane polymer.

8. The membrane electrode assembly according to claim 7, wherein the solid polymer electrolyte membrane containing the second metalloxane polymer has a network structure of the metalloxane polymer introduced therein.

9. The membrane electrode assembly according to claim 7, wherein the solid polymer electrolyte membrane contains of the second metalloxane polymer in an amount of 0.5 to 50 wt % of the total weight of the solid polymer electrolyte membrane and the second metalloxane polymer contained therein.

10. The membrane electrode assembly according to claim 7, wherein the second metalloxane polymer is formed from a polycondensate of at least one member selected from a group consisting of silicon-based alkoxides, titanium-based alkoxides, and zirconium-based alkoxides.

11. The membrane electrode assembly according to claim 10, wherein the silicon-based alkoxides comprise at least one member selected from a group consisting of tetramethoxysilane, tetraethoxysilane, methyltrimethoxysilane, methyltriethoxysilane, ethyltrimethoxysilane, ethyltriethoxysilane, dimethyldimethoxysilane, dimethyldiethoxysilane, phenyltrimethoxysilane, phenyltriethoxysilane, dimethoxydiphenylsilane, diethoxydiphenylsilane, dimethoxymethylphenylsilane, diethoxymethylphenylsilane, phenethyltrimethoxysilane, phenethyltriethoxysilane, and derivatives thereof.

12. The membrane electrode assembly according to claim 1, wherein the one electrode has a diffusion layer on a gas-phase surface of the catalyst layer that is located opposite to a surface thereof facing the solid polymer electrolyte membrane, the diffusion layer being a layer for supplying a reactant gas to, and exchanging electrons with, the catalyst layer.

13. A solid polymer fuel cell using the membrane electrode assembly according to claim 1.

14. The solid polymer fuel cell according to claim 13, wherein a gas-phase surface of the intra-catalyst-layer electrolyte is covered with a gas-permeable, water-repellent layer.

15. The solid polymer fuel cell according to claim 14, wherein the water-repellent layer is a polycondensate layer resulting from polycondensation of a solution applied to the gas-phase surface of the intra-catalyst-layer electrolyte of the catalyst layer, the solution containing a hydrophobic metalloxane precursor.

16. The solid polymer fuel cell according to claim 14, wherein the water-repellent layer is a basic layer resulting from acid-base reaction between a base and an ion exchange group that are present at the gas-phase surface of the intra-catalyst-layer electrolyte of the catalyst layer.

17. The solid polymer fuel cell according to claim 14, wherein the water-repellent layer is a deposit layer resulting from deposition of a gas-permeable, water-repellent material on the gas-phase surface of the intra-catalyst-layer electrolyte of the catalyst layer through a gas phase.

18. The solid polymer fuel cell according to claim 14, wherein an electrolyte having hydrophobic segments bonded to a terminal of a main chain and/or a side chain is used as the intra-catalyst-layer electrolyte of the catalyst layer, and the water-repellent layer is an uneven-distribution layer resulting from uneven distribution of the hydrophobic segments at the gas-phase surface of the catalyst layer.

* * * * *

UNITED STATES PATENT AND TRADEMARK OFFICE
CERTIFICATE OF CORRECTION

PATENT NO. : 6,713,207 B2
DATED : March 30, 2004
INVENTOR(S) : Kyoko Tsusaka et al.

It is certified that error appears in the above-identified patent and that said Letters Patent is hereby corrected as shown below:

<u>Title page,</u>
Item [56], References Cited, U.S. PATENT DOCUMENTS, should read:
-- 3,707,522 A    12/1972    Simons
   5,378,800 A    1/1995     Mok et al.
   5,722,295 A    3/1998     Sakai
   5,872,175 A    2/1999     Lee --

FOREIGN PATENT DOCUMENTS, should read:
-- JP    4-58822          9/1992
   JP    6-76838          3/1994
   JP    6-111827         4/1994
   JP    6-231780         8/1994
   JP    9-320611         12/1997
   JP    10-340732        12/1998
   WO    WO 97/03476      1/1997
   WO    WO99/38909 A1 8/1999 --

OTHER PUBLICATIONS, should read:
-- K.A. Maurtiz, et al., "Microstructural Evolution of a Silicon Oxide Phase in a Perfluorosulfonic Acid Ionomer by an In Situ Sol-Gel Reaction"; Journal of Applied Polymer Science, Vol. 55, 1995, P. 181-190. --

UNITED STATES PATENT AND TRADEMARK OFFICE
CERTIFICATE OF CORRECTION

PATENT NO.    : 6,713,207 B2
DATED         : March 30, 2004
INVENTOR(S)   : Kyoko Tsusaka et al.

It is certified that error appears in the above-identified patent and that said Letters Patent is hereby corrected as shown below:

<u>Title page, cont'd,</u>
Item [57], ABSTRACT, should read:
-- Disclosed is a membrane electrode assembly obtained by bonding electrodes to both surfaces of a solid polymer electrolyte membrane suitably for use in a solid polymer fuel cell. In order to maintain not only the solid polymer electrolyte but also the electrode in appropriate wet states, the catalyst layer of the assembly contains a metalloxane polymer in the intra-catalyst-layer electrolyte including an electrode catalyst preferably in an amount of 0.5 to 50 wt% of the total weight of the intra-catalyst-layer electrolyte and the metalloxane polymer contained therein exclusive of the electrode catalyst. It is also preferred that a metalloxane polymer be included in the solid polymer electrolyte membrane in an amount of 0.5 to 50 wt% of the total weight of the solid polymer electrolyte membrane and the metalloxane polymer contained therein. The membrane electrode assembly constituted as above may be obtained by bonding the catalyst layer containing assembly constituted as above may be obtained by bonding the catalyst layer containing metalloxane monomer to the solid polymer electrolyte membrane by hot-pressing or the like. Here, it is preferred that the gas-phase surface of the intra-catalyst-layer electrolyte be covered with a gas-permeable, water repellent layer. The water-repellent layer may be formed by various methods such as applying hydrophobic metalloxane precursor, followed by polycondensation. --

Signed and Sealed this

Eleventh Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,713,207 B2
DATED : March 30, 2004
INVENTOR(S) : Kyoko Tsusaka et al.

It is certified that error appears in the above-identified patent and that said Letters Patent is hereby corrected as shown below:

Title page,
Item [56], References Cited, U.S. PATENT DOCUMENTS,
"3,707,522 A    12/1972    Simons
 5,378,800 A    1/1995     Mok et al.
 5,722,295 A    3/1998     Sakai
 5,872,175 A    2/1999     Lee FOREIGN PATENT DOCUMENTS,
 JP      4-58822        9/1992
 JP      6-76838        3/1994
 JP      6-111827       4/1994
 JP      6-231780       8/1994
 JP      9-320611       12/1997
 JP      10-340732      12/1998
 WO      WO 97/03476    1/1997
 WO      WO99/38909 A1 8/1999" should read -- JP     4-58822        9/1992
 JP      6-76838        3/1994
 JP      6-111827       4/1994
 JP      6-231780       8/1994
 JP      9-320611       12/1997
 JP      10-340732      12/1998
 WO      WO 97/03476    1/1997 --

OTHER PUBLICATIONS,
"Asahi Chem Ind. Co. Ltd., "High-Strength Polyamide Fiber And Its Production", Patent Abstracts of Japan, Publication No. 06173166, June. 21, 1994.
Melvin I. Kohan, Nylon Plastics Handbook, Hanser, p. 542.
, Hanser/Gardner Publications, Inc., Sep. 1995.
Derwent Publication, JP 62185747, Japan Synthetic Rubber Co. Ltd., Aug. 14, 1987.
Derwent Publlication, JP 09089081, Fuji Heavy Ind. Ltd., Toray Ind., Aug. 14, 1987.
Derwent Publication, JP 10060269, Unitika Ltd. (10060269) Mar. 3, 1998." should read:

-- K.A. Maurtiz, et al., "Microstructural Evolution of a Silicon Oxide Phase in a Perfluorosulfonic Acid Ionomer by an In Situ Sol-Gel Reaction"; Journal of Applied Polymer Science, Vol. 55, 1995, P. 181-190. --

UNITED STATES PATENT AND TRADEMARK OFFICE
CERTIFICATE OF CORRECTION

PATENT NO. : 6,713,207 B2
DATED : March 30, 2004
INVENTOR(S) : Kyoko Tsusaka et al.

It is certified that error appears in the above-identified patent and that said Letters Patent is hereby corrected as shown below:

<u>Title page, cont'd,</u>
Item [57], ABSTRACT, should read:
-- Disclosed is a membrane electrode assembly obtained by bonding electrodes to both surfaces of a solid polymer electrolyte membrane suitably for use in a solid polymer fuel cell. In order to maintain not only the solid polymer electrolyte but also the electrode in appropriate wet states, the catalyst layer of the assembly contains a metalloxane polymer in the intra-catalyst-layer electrolyte including an electrode catalyst preferably in an amount of 0.5 to 50 wt% of the total weight of the intra-catalyst-layer electrolyte and the metalloxane polymer contained therein exclusive of the electrode catalyst. It is also preferred that a metalloxane polymer be included in the solid polymer electrolyte membrane in an amount of 0.5 to 50 wt% of the total weight of the solid polymer electrolyte membrane and the metalloxane polymer contained therein. The membrane electrode assembly constituted as above may be obtained by bonding the catalyst layer containing assembly constituted as above may be obtained by bonding the catalyst layer containing metalloxane monomer to the solid polymer electrolyte membrane by hot-pressing or the like. Here, it is preferred that the gas-phase surface of the intra-catalyst-layer electrolyte be covered with a gas-permeable, water repellent layer. The water-repellent layer may be formed by various methods such as applying hydrophobic metalloxane precursor, followed by polycondensation. --

This certificate supersedes Certificate of Correction issued January 11, 2005.

Signed and Sealed this

Third Day of May, 2005

JON W. DUDAS
*Director of the United States Patent and Trademark Office*